United States Patent
Takano

(10) Patent No.: US 9,225,487 B2
(45) Date of Patent: Dec. 29, 2015

(54) WIRELESS RESOURCE ALLOCATION METHOD AND WIRELESS RESOURCE ALLOCATION DEVICE, AND COMMUNICATION SYSTEM

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 148 days.

(21) Appl. No.: 14/113,749

(22) PCT Filed: Apr. 16, 2012

(86) PCT No.: PCT/JP2012/060266
§ 371 (c)(1),
(2), (4) Date: Oct. 24, 2013

(87) PCT Pub. No.: WO2012/165069
PCT Pub. Date: Dec. 6, 2012

(65) Prior Publication Data
US 2014/0050131 A1    Feb. 20, 2014

(30) Foreign Application Priority Data

May 30, 2011    (JP) .................................. 2011-119884

(51) Int. Cl.
*H04W 72/04*    (2009.01)
*H04L 5/00*    (2006.01)
*H04W 72/08*    (2009.01)
*H04L 5/14*    (2006.01)

(52) U.S. Cl.
CPC ............ *H04L 5/0037* (2013.01); *H04L 5/0073* (2013.01); *H04L 5/1469* (2013.01); *H04W 72/082* (2013.01)

(58) Field of Classification Search
None
See application file for complete search history.

(56) References Cited

U.S. PATENT DOCUMENTS

2008/0192660 A1*    8/2008    Li et al. ......................... 370/294

FOREIGN PATENT DOCUMENTS

| EP | 1 793 635 A1 | 6/2007 | |
| EP | 1 806 856 A1 | 7/2007 | |
| EP | 1806856 A1 * | 7/2007 | ............. H04L 12/56 |
| JP | 2010-539785 A | 12/2010 | |
| WO | WO 01/99454 A1 | 12/2001 | |
| WO | WO 2009/120701 A2 | 10/2009 | |

OTHER PUBLICATIONS

Need and Feasibility of using different uplink-downlink configuration for TDD HeNBs—3GPP TSG RAN R1-103688, Jun. 28-Jul. 2, 2010.*

(Continued)

*Primary Examiner* — Wanda Z Russell
*Assistant Examiner* — Jeff Banthrongsack
(74) *Attorney, Agent, or Firm* — Oblon, McClelland, Maier & Neustadt, L.L.P.

(57) ABSTRACT

Inter-cell interference is avoided in a cellular system operated in a TDD scheme. An order of a plurality of configurations are rearranged in the ascending order of the number of downlink sub frames and in the descending order of the number of uplink sub frames, and configurations are switched between neighboring cells according to the rearranged order when different configurations are used in the neighboring cells. Further, an order of at least some configurations is further rearranged so that interference between adjacent configurations is reduced while maintaining the ascending order of the number of downlink sub frames.

15 Claims, 24 Drawing Sheets

(56) References Cited

OTHER PUBLICATIONS

ABS Signaling considerations for LTE-A TDD—3GPP TSG RAN R1-105940, Nov. 15-19, 2010.*
"Discussion on the solutions for common information interference coordination in TDD systems", 3GPP TSG-RAN WG1#63, R1-106312, CMCC, Nov. 15-19, 2010, 5 pages.
Extended European Search Report issued Oct. 23, 2014 in Patent Application No. 12793580.7.
"ABS signaling considerations for LTE-A TDD", New Postcom, 3GPP TSG RAN WG1 Meeting #63, R1-105940, XP 050468436, (Nov. 11, 2010), 4 pages.
"Need and feasibility of using different uplink-downlink configurations for TDD HeNBs in Heterogeneous Networks", New Postcom, 3GPP TSG RAN WG1 Meeting #61 bis, R1-103688, XP050648390, (Jun. 22, 2010), 6 pages.
U.S. Appl. No. 14/113,235, filed Oct. 22, 2013, Takano.

* cited by examiner

FIG. 1

| | #3 | #4 | #5 | #6 | #7 | #8 | #9 |
|---|---|---|---|---|---|---|---|
| CONFIGURATION 0 | U | U | | S | U | U | U |
| CONFIGURATION 6 | U | U | | S | U | U | D |
| CONFIGURATION 1 | U | U | | S | U | U | D |
| CONFIGURATION 3 | U | U | | D | D | U | D |
| CONFIGURATION 2 | U | D | | S | U | D | D |
| CONFIGURATION 4 | D | D | | D | D | D | D |
| CONFIGURATION 5 | D | D | | D | D | D | D |

FIG. 2

| | #3 | #4 | | | #6 | #7 | #8 | #9 |
|---|---|---|---|---|---|---|---|---|
| CONFIGURATION 0 | U | U | | | S | U | U | U |
| CONFIGURATION 6 | U | U | | | S | U | U | D |
| CONFIGURATION 1 | U | D | | | S | U | U | D |
| CONFIGURATION 3 | U | U | | | D | D | D | D |
| CONFIGURATION 2 | D | D | | | S | U | D | D |
| CONFIGURATION 4 | U | D | | | D | D | D | D |
| CONFIGURATION 5 | D | D | | | D | D | D | D |

| | | | | | | | | | |
|---|---|---|---|---|---|---|---|---|---|
| CONFIGURATION 0 | | | #3 U | #4 U | | #6 S | #7 U | #8 U | #9 U |
| CONFIGURATION 6 | | | #3 U | #4 U | | #6 S | #7 U | #8 U | #9 D |
| CONFIGURATION 1 | | | #3 U | #4 D | | #6 S | #7 U | #8 U | #9 D |
| CONFIGURATION 2 | | | #3 D | #4 D | | #6 S | #7 U | #8 D | #9 D |
| CONFIGURATION 3 | | | #3 U | #4 U | | #6 D | #7 D | #8 D | #9 D |
| CONFIGURATION 4 | | | #3 U | #4 D | | #6 D | #7 D | #8 D | #9 D |
| CONFIGURATION 5 | | | #3 D | #4 D | | #6 D | #7 D | #8 D | #9 D |

| | #3 | #4 | | #6 | #7 | #8 | #9 |
|---|---|---|---|---|---|---|---|
| CONFIGURATION 0 | U | U | | S | U | U | U |
| CONFIGURATION 6 | U | U | | S | U | U | D |
| CONFIGURATION 1 | U | D | | S | U | U | D |
| CONFIGURATION 2 | D | D | | S | U | U | D |
| NEW CONFIGURATION | U | U | | S | U | D | D |
| CONFIGURATION 3 | U | D | | D | D | D | D |
| CONFIGURATION 4 | D | D | | D | D | D | D |
| CONFIGURATION 5 | D | D | | D | D | D | D |

| | #3 | #4 | | #6 | #7 | #8 | #9 |
|---|---|---|---|---|---|---|---|
| CONFIGURATION 0 | U | U | | S | U | U | U |
| CONFIGURATION 6 | U | U | | S | U | U | D |
| CONFIGURATION 1 | U | U | | S | U | U | D |
| CONFIGURATION 3 | U | D | | D | D | U | D |
| CONFIGURATION 4 | U | D | | D | D | D | D |
| CONFIGURATION 2 | D | D | | S | U | D | D |
| CONFIGURATION 5 | D | D | | D | D | D | D |

FIG. 12

| | #3 | #4 | | #6 | #7 | #8 | #9 |
|---|---|---|---|---|---|---|---|
| CONFIGURATION 0 | U | U | | S | U | U | U |
| CONFIGURATION 6 | U | U | | S | U | U | D |
| CONFIGURATION 1 | U | U | | S | U | U | D |
| CONFIGURATION 3 | U | D | | D | D | D | D |
| CONFIGURATION 4 | U | D | | D | D | D | D |
| CONFIGURATION 2 | D | D | | S | U | D | D |
| CONFIGURATION 5 | D | D | | D | D | D | D |

FIG. 13

| | #3 | #4 | | #6 | #7 | #8 | #9 |
|---|---|---|---|---|---|---|---|
| CONFIGURATION 0 | U | U | | S | U | U | U |
| CONFIGURATION 6 | U | U | | S | U | U | D |
| CONFIGURATION 1 | U | D | | S | U | U | D |
| NEW CONFIGURATION | U | U | | S | U | D | D |
| CONFIGURATION 3 | U | U | | D | D | D | D |
| CONFIGURATION 4 | U | D | | D | D | D | D |
| CONFIGURATION 2 | D | D | | S | U | D | D |
| CONFIGURATION 5 | D | D | | D | D | D | D |

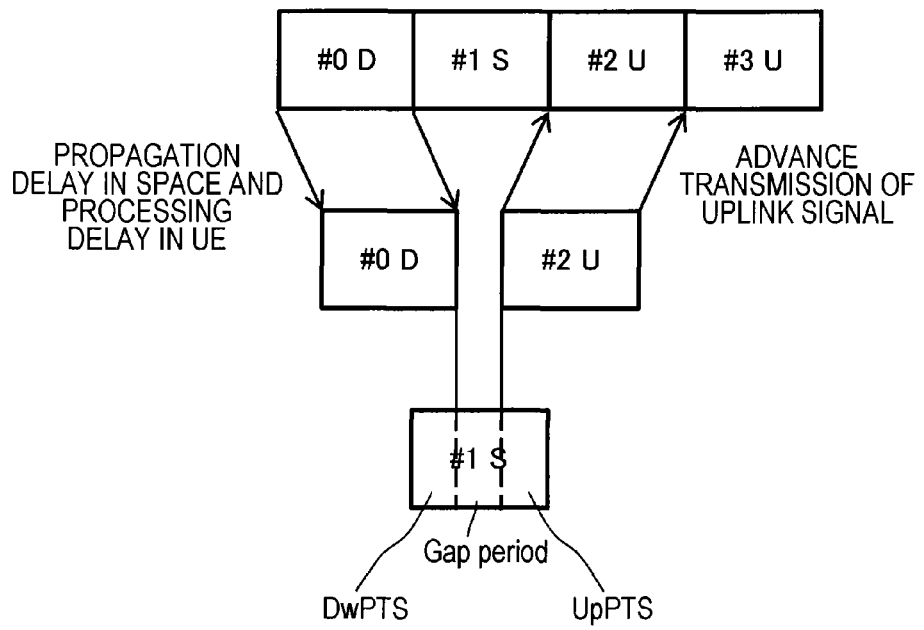

FIG. 20

| | #3 | #4 | #5 | #6 | #7 | #8 | #9 |
|---|---|---|---|---|---|---|---|
| CONFIGURATION 0 | U | U | D | S | U | U | U |
| CONFIGURATION 1 | U | D | D | S | U | U | D |
| CONFIGURATION 2 | D | D | D | S | U | D | D |
| CONFIGURATION 3 | U | U | D | D | D | D | D |
| CONFIGURATION 4 | D | D | D | D | D | D | D |
| CONFIGURATION 5 | D | D | D | D | D | D | D |
| CONFIGURATION 6 | U | U | D | S | U | U | D |

FIG. 21

| | #3 | #4 | | #6 | #7 | #8 | #9 |
|---|---|---|---|---|---|---|---|
| CONFIGURATION 0 | U | U | | S | U | U | U |
| CONFIGURATION 6 | U | U | | S | U | U | D |
| CONFIGURATION 1 | U | D | | S | U | U | D |
| CONFIGURATION 2 | D | D | | S | U | D | D |
| CONFIGURATION 5 | D | D | | D | D | D | D |
| CONFIGURATION 4 | U | D | | D | D | D | D |
| CONFIGURATION 3 | U | U | | D | D | D | D |

FIG. 22

WIRELESS RESOURCE ALLOCATION METHOD AND WIRELESS RESOURCE ALLOCATION DEVICE, AND COMMUNICATION SYSTEM

TECHNICAL FIELD

The technology disclosed in the present disclosure relates to a wireless resource allocation method, a wireless resource allocation device, and a communication system, which are capable of deciding an allocation of wireless resources in a cellular system operating according to a time division duplex (TDD) scheme, and more particularly, to a wireless resource allocation method, a wireless resource allocation device, and a communication system, which are capable of performing an allocation of wireless resources to avoid interference caused as an uplink and a downlink are mismatched when different configurations are used in neighboring cells.

BACKGROUND ART

Currently, in the third generation partnership project (3GPP), an international standard "international mobile telecommunications (IMT)-2000" of a 3G mobile communication system designed by an international telecommunication union (ITU) is being standardized. Long term evolution (LTE) which is one of data communication specifications designed by the 3GPP is a long term advanced system aiming for the fourth generation (4G) IMT-Advanced, and is called "3.9G (super 3G)." One of features of 4G lies in that a maximum communication rate or a quality improvement at a cell edge can be implemented using a technique such as a relay or a carrier aggregation.

In the long term evolution (LTE), two duplex schemes of frequency division duplex (FDD) and time division duplex (TDD) can be selected.

In the FDD, an uplink-dedicated band and a downlink-dedicated band are used. In the uplink and the downlink, a format of a radio frame configured with 10 consecutive sub frames is used. Here, an uplink refers to communication from a user equipment (UE) (terminal) to an eNodeB (base station), and a downlink refers to communication from an eNodeB to a UE.

In the TDD, a format of a radio frame configured with ten consecutive sub frames is used. However, in the TDD, communication is performed using the same band in the uplink and the downlink. For this reason, as illustrated in FIG. 18, a radio frame configured with ten consecutive sub frames #0 to #9 is shared and used such that sub frames are allocated as an uplink sub frame and a downlink sub frame (in FIG. 18, "D" represents a downlink sub frame, "U" represents an uplink sub frame, and "S" represents a special sub frame (which will be described later)).

Meanwhile, in the TDD, it is necessary to secure a time to switch the downlink and the uplink. Specifically, when an allocation of a sub frame switches from the downlink to the uplink, it is necessary to insert "a special sub frame". From a point of view of an eNodeB side, a downlink signal of an eNodeB is subjected to a propagation delay in space and a processing delay in a UE and thus delayed compared to a downlink position of a format until reception of the downlink signal is completed by the UE. Meanwhile, in order for an uplink signal of an UE to reach an eNodeB up to an uplink position of a format, an UE needs to start transmission of the uplink signal before the uplink position of the format. Therefore, a special sub frame inserted between a downlink sub frame and an uplink sub frame is defined by an area (a downlink pilot timeslot: DwPTS) by a delay of a downlink signal, an area (an uplink pilot timeslot: UpPTS) corresponding to a degree by which an uplink signal is transmitted early, and a gap (gap period) between the two areas. FIG. 19 illustrates an example in which a special sub frame is inserted after the sub frame #1 when switching from the downlink to the uplink is performed between the sub frame #0 and the sub frame #2 in the radio frame using the configuration illustrated in FIG. 18. As described above, the TDD has the demerit that it is necessary to insert a special sub frame when switching between the downlink and the uplink is performed (switching from the downlink to the uplink is performed).

For example, a cellular communication system in which at least one of sub frames available for uplink or downlink traffic is configured to include a portion used in uplink traffic, a portion used in downlink traffic, and a guard period portion used as a guard period scheduled between the uplink portion and the downlink portion, and at least two consecutive periods of the three portions can be changed to comply with the current necessity of a system has been proposed (for example, see Patent Document 1).

The TDD of the LTE is defined in the 3GPP Rel 8. FIG. 20 illustrates seven configurations 0 to 6 of the TDD defined in the LTE (TS36.211 Table 4.2-2). Generally, an operator is considered to use one of the seven configurations. Therefore, the operator is not considered to use different configurations in neighboring eNodeBs.

When neighboring eNodeBs use different TDD configurations, as can be understood from FIG. 20, links of different directions such as the uplink and the downlink are allocated at the position of at least one of the sub frames #3, #4, and #6 to #9, that is, the uplink and the downlink are mismatched.

FIG. 23 illustrates an example in which links of different directions such as the uplink and the downlink are allocated at the position of the same sub frame of neighboring eNodeBs. In FIG. 23, in a cell 1, a downlink signal is transmitted from an eNodeB to a UE, and in a cell 2, an uplink signal is transmitted from a UE to an eNodeB. It is understood that a transmission signal from the eNodeB at the time of downlink in the cell 1 serves as interference to a reception signal of the eNodeB at the time of uplink in the neighboring cell 2. Further, it can be understood that a transmission signal from the UE at the time of uplink in the cell 2 serves as interference to a reception signal of the UE at the time of downlink in the neighboring cell 1. In FIG. 23, a downlink or uplink transmission signal between the eNodeB and the UE in the same cell is indicated by a solid line, and a signal serving as interference to the neighboring cell is indicated by a dotted line.

FIG. 24 illustrates an example in which different TDD configurations are used in relative large areas. For example, such configuration switching occurs in the boundary between Chiba Prefecture and Tokyo Metropolitan. In FIG. 24, the configuration 0 is used in the left area, and the configuration 1 is used in the right area. Referring back to FIG. 20, when the area using the configuration 0 is adjacent to the area using the configuration 1, the uplink and the downlink are mismatched at the positions of the sub frames #4 and #9.

FIG. 24 illustrates an example in which the sub frame #4 is allocated for the uplink (UP) in the left area using the configuration 0 but allocated for the downlink (DN) in the right area using the configuration 1. When different TDD configurations are used in relative large areas, a boundary surface in which the uplink and the downlink are mismatched extends across a relative broad area as indicated by a thick line in FIG. 24. Further, there occurs a problem in that along the mismatch boundary surface, a transmission signal from an eNodeB at the time of downlink serves as interference to a reception signal of a neighboring eNodeB at the time of uplink, and a transmission signal from a UE at the time of uplink serves as interference to a reception signal of a UE at the time of downlink in a neighboring cell.

FIG. 25 illustrates an example in which cells using different TDD configurations are located a spot-like manner. In FIG. 25, in an area using the configuration 1, only a cell indicated by a thick line is assumed to use the configuration 0. When the area using the configuration 0 is adjacent to the area using the configuration 1, the uplink and the downlink are mismatched at the positions of the sub frames #4 and #9 (same as above). In FIG. 25, a spot-like cell that uses the configuration 0 and is allocated the uplink (UP) for the sub frame #4 is surrounded by cells that use the configuration 1 and are allocated the downlink (DN) for the sub frame #4. In this case, a problem in which the uplink and the downlink are mismatched occurs locally.

CITATION LIST

Patent Document

Patent Document 1: JP 2010-539785 W

SUMMARY OF THE INVENTION

Problems to be Solved by the Invention

It is an object of the technology disclosed in the present disclosure to provide an wireless resource allocation method, a wireless resource allocation device, and a communication system, which are excellent and capable of appropriately performing an allocation of wireless resources to reduce interference caused as an uplink and a downlink are mismatched between neighboring cells in a cellular system operating according to the TDD scheme.

It is another object of the technology disclosed in the present disclosure to provide an wireless resource allocation method, a wireless resource allocation device, and a communication system, which are excellent and capable of appropriately performing an allocation of wireless resources to reduce interference caused as an uplink and a downlink are mismatched when different configurations are used in neighboring cells in a cellular system in which a plurality of configurations in which each of sub frames of a radio frame is allocated for an uplink or a downlink are defined.

Solutions to Problems

The present application has been made in light of the above problems, and the technology set forth in a first aspect is a wireless resource allocation method which includes a rearranging step of revising a configuration arrangement of a plurality of configurations in view of an increase in the number of downlink sub frames or a decrease in the number of uplink sub frames in a cellular communication system in which a plurality of configurations that differ in an uplink allocation and a downlink allocation of sub frames in a radio frame are defined, and a configuration switching step of switching configurations between neighboring cells according to the arrangement revised in the rearranging step when different configurations are used in the neighboring cells in the cellular communication system.

According to the technology set forth in a second aspect of the present application, in the wireless resource allocation method according to the first aspect, in the rearranging step, an arrangement of at least some configurations is revised to reduce the number of sub frames in which an uplink and a downlink are mismatched between adjacent configurations such that the plurality of configurations are arranged preferentially in the ascending order of the number of downlink sub frames rather than the descending order of the number of uplink sub frames.

According to the technology set forth in a third aspect of the present application, in the wireless resource allocation method according to the first aspect, in the rearranging step, an arrangement of at least some configurations is revised to reduce the number of sub frames in which an uplink and a downlink are mismatched between adjacent configurations such that the plurality of configurations are arranged preferentially in the descending order of the number of uplink sub frames rather than the ascending order of the number of downlink sub frames.

According to the technology set forth in a fourth aspect of the present application, the wireless resource allocation method according to the first aspect further includes a new configuration inserting step of inserting a newly defined configuration between adjacent configurations in which the number of sub frames in which the uplink and the downlink are mismatched still increases in the arrangement revised in the rearranging step, and in the configuration switching step, configurations are switched between the neighboring cells according to an arrangement in which the newly defined configuration is inserted.

According to the technology set forth in a fifth aspect of the present application, in the wireless resource allocation method according to the fourth aspect, in the new configuration inserting step, a configuration is newly defined such that sub frames in which the uplink and the downlink are mismatched between the adjacent configurations are dispersed into sub frames in which the uplink and the downlink are mismatched between the corresponding configuration and each of the adjacent configurations.

According to the technology set forth in a sixth aspect of the present application, the wireless resource allocation method according to the first aspect further includes an interference avoiding step of avoiding interference between the neighboring cells in sub frames in which the uplink and the downlink are mismatched between the neighboring cells whose configurations are switched in the configuration switching step.

According to the technology set forth in a seventh aspect of the present application, in the wireless resource allocation method according to the sixth aspect, in the interference avoiding step, in sub frames in which the uplink and the downlink are mismatched between the neighboring cells, transmission from a base station and reception in a terminal in a cell allocated for the downlink are stopped.

According to the technology set forth in a eight aspect of the present application, in the wireless resource allocation method according to the sixth aspect, in the interference avoiding step, in sub frames in which the uplink and the downlink are mismatched between the neighboring cells, transmission from a terminal and reception in a base station in a cell allocated for the uplink are stopped, or transmission from a base station and reception in a terminal in a cell allocated for the downlink are stopped so that sub frames whose transmission is stopped are not concentrated in some configurations.

According to the technology set forth in ninth aspect of the present application, in the wireless resource allocation method according to the sixth aspect, in the interference avoiding step, in sub frames in which the uplink and the downlink are mismatched between the neighboring cells, transmission from a terminal and reception in a base station in a cell allocated for the uplink are stopped, or transmission from a base station and reception in a terminal in a cell allocated for the downlink are stopped according to concentration of traffic of each cell.

According to the technology set forth in a tenth aspect of the present application, in the wireless resource allocation method according to the sixth aspect, in the interference avoiding step, in sub frames in which a certain cell interferes with both adjacent cells using different configurations, transmission and reception in a base station and a terminal in the corresponding cell are stopped.

Further, the technology set forth in an eleventh aspect of the present application is a wireless resource allocation device which includes a rearranging unit that revises a configuration arrangement of a plurality of configurations in view of an increase in the number of downlink sub frames or a decrease in the number of uplink sub frames in a cellular communication system in which a plurality of configurations that differ in an uplink allocation and a downlink allocation of sub frames in a radio frame are defined, and a configuration switching unit that switches configurations between neighboring cells according to the arrangement revised in the rearranging step when different configurations are used in the neighboring cells in the cellular communication system.

Further, the technology set forth in a twelfth aspect of the present application is a communication system that is configured to revise a configuration arrangement of a plurality of configurations in which an uplink allocation and a downlink allocation of sub frames in a radio frame are defined in view of an increase in the number of downlink sub frames and a decrease in the number of uplink sub frames, and switch configurations between neighboring cells according to the revised arrangement when different configurations are used in the neighboring cells.

Here, a "system" refers to one in which a plurality of devices (or functional modules for implementing a specific function) are logically aggregated, and it is not consequential practically whether the devices or the functional modules are within a single housing.

Effects of the Invention

According to the technology disclosed in the present disclosure, it is possible to provide an wireless resource allocation method, a wireless resource allocation device, and a communication system, which are excellent and capable of appropriately performing an allocation of wireless resources to reduce interference caused as an uplink and a downlink are mismatched between neighboring cells in a cellular system operating according to the TDD scheme.

Further, according to the technology disclosed in the present disclosure, it is possible to provide an wireless resource allocation method, a wireless resource allocation device, and a communication system, which are excellent and capable of appropriately performing an allocation of wireless resources to avoid interference caused as an uplink and a downlink are mismatched when different configurations are used in neighboring cells in a cellular system in which a plurality of configurations in which each of sub frames of a radio frame is allocated for an uplink and a downlink are defined.

In the cellular communication system according to the technology disclosed in the present disclosure, since different TDD configurations can be used according to a traffic state, the throughput of the entire system is improved.

Other object or advantages of the technology disclosed in the present disclosure will be clear through an embodiment which will be described later or the detailed description based on the appended drawings.

BRIEF DESCRIPTION OF DRAWINGS

FIG. 1 is a diagram illustrating seven TDD configurations 0 to 6 defined in LTE (TS36.211 Table 4.2-2) the ascending order of the number of downlink sub frames and the descending order of the number of uplink sub frames.

FIG. 2 is a diagram illustrating sub frames in which an uplink and a downlink are mismatched between configurations vertically adjacent to each other in FIG. 1.

FIG. 3 is a diagram illustrating sub frames in which the uplink and the downlink are mismatched between configurations vertically adjacent to each other in FIG. 20.

FIG. 4 is a diagram illustrating an example in which configurations 2 and 3 which have the same number of downlink sub frames in FIG. 1 are switched.

FIG. 5 is a diagram illustrating sub frames in which the uplink and the downlink are mismatched between configurations vertically adjacent to each other in FIG. 4.

FIG. 6 is a diagram illustrating an example of a newly defined configuration which is inserted between configurations 2 and 3 in the configuration arrangement illustrated in FIG. 4.

FIG. 7 is a diagram illustrating sub frames in which the uplink and the downlink are mismatched between configurations vertically adjacent to each other in FIG. 6.

FIG. 8 is a diagram illustrating an example in which interference is avoided by stopping a downlink transmission of a base station through a sub frame specified to interfere between configurations adjacent to each other in FIG. 7.

FIG. 9 is a diagram illustrating a state in which ABSs are arranged in sub frames specified to interfere with each other between configurations adjacent to each other in FIG. 7 so that ABSs are not concentrated in some configurations.

FIG. 10 is a diagram illustrating another example in which ABSs are arranged in sub frames specified to interfere with each other between configurations adjacent to each other in FIG. 7.

FIG. 11 is a diagram illustrating an example in which configurations 1 and 3 which are the same in the number of uplink sub frames in FIG. 1 are switched.

FIG. 12 is a diagram illustrating sub frames in which the uplink and the downlink are mismatched between configurations vertically adjacent to each other in FIG. 11.

FIG. 13 is a diagram illustrating an example of a newly defined configuration which is inserted between configurations 1 and 3 in the configuration arrangement illustrated in FIG. 11.

FIG. 14 is a diagram illustrating sub frames in which the uplink and the downlink are mismatched between configurations vertically adjacent to each other in FIG. 13.

FIG. 15 is a diagram illustrating a state in which ABSs are arranged in one cell in sub frames specified to interfere with each other between configurations adjacent to each other in FIG. 7.

FIG. 18 is a diagram illustrating an example in which 10 consecutive sub frames #0 to #9 of a radio frame are allocated as an uplink sub frame and a downlink sub frame and shared.

FIG. 19 is a diagram illustrating an example in which a special sub frame is inserted when switching from a downlink to an uplink is performed between a sub frame #0 and a sub frame #2.

FIG. 20 is a diagram illustrating seven TDD configurations 0 to 6 defined in LTE (TS36.211 Table 4.2-2).

FIG. 21 is a diagram illustrating an example in which a rearrangement is performed to reduce interference caused by a mismatch of the uplink and the downlink according to different configurations used in neighboring cells in FIG. 1.

FIG. 22 is a diagram illustrating sub frames in which the uplink and the downlink are mismatched between configurations vertically adjacent to each other in FIG. 21.

MODE FOR CARRYING OUT THE INVENTION

Figure 16:
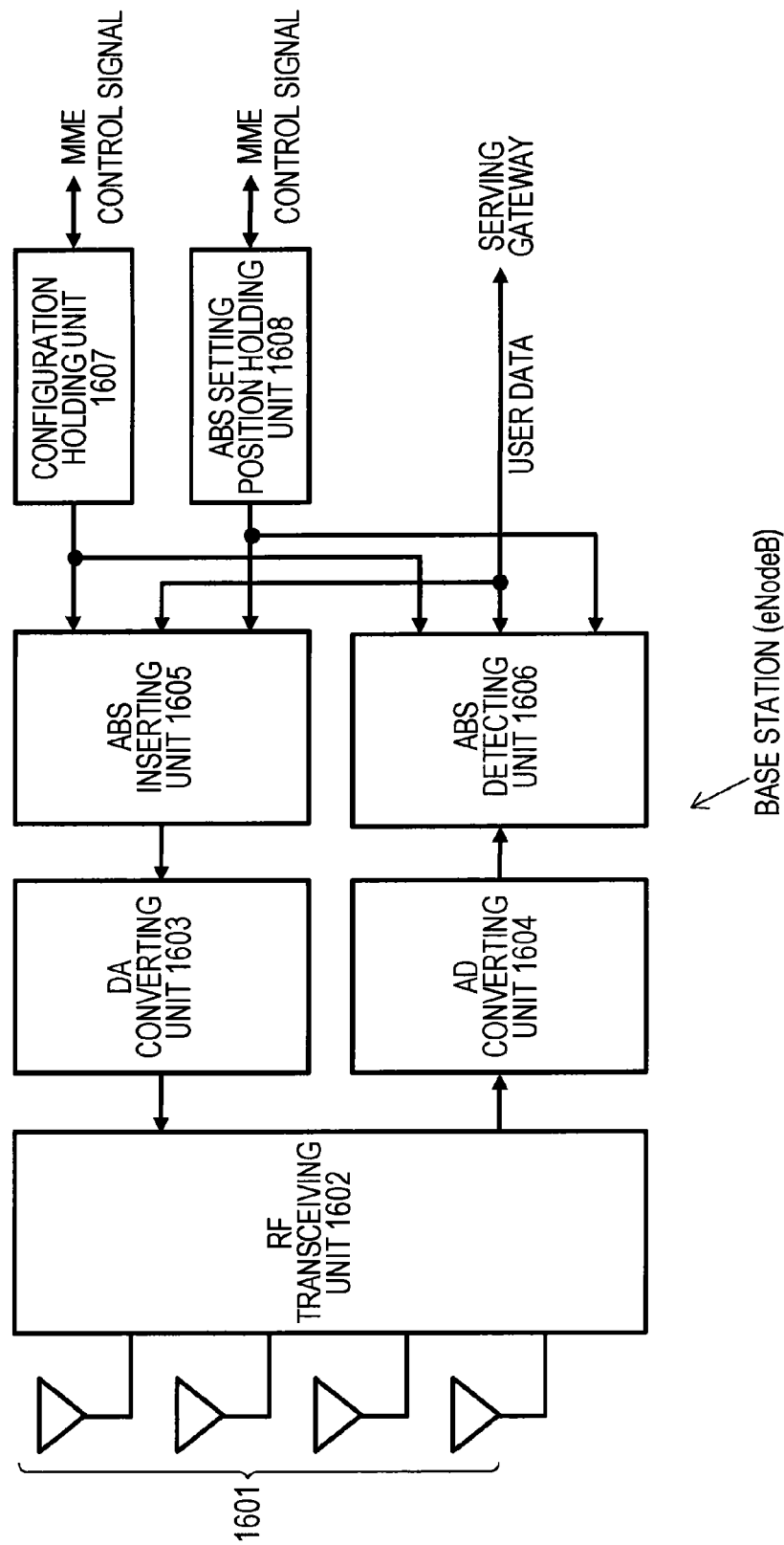
FIG. 16 is a diagram schematically illustrating a functional configuration of a communication device operating as a base station (eNodeB) in a cellular communication system according to the technology disclosed in the present disclosure.

Hereinafter, an embodiment of the technology disclosed in the present disclosure will be described in detail with reference to the appended drawings.

FIG. 20 illustrates the seven TDD configurations 0 to 6 defined in the LTE (TS36.211 Table 4.2-2). As described above, the sub frame #0 is fixedly allocated to the downlink in all of the configurations, the sub frame #1 is fixedly allocated to the special sub frame in all of the configurations, the sub frame #2 is fixedly allocated to the uplink in all of the configurations, and the sub frame #5 is fixedly allocated to the downlink in all of the configurations. When different TDD configurations are used in neighboring eNodeBs, it is likely that in the sub frame #3, #4, and #6 to #9 other than the above-mentioned sub frames, the uplink and the downlink are mismatched, and thus interference occurs.

The operator can change the ratio of the uplink and the downlink in the radio frame through the configuration to be used. The following Table 1 represents the number of downlink sub frames and the number of uplink sub frames of each configuration.

TABLE 1

| Configuration | Number of downlink sub frames | Number of uplink sub frames |
|---|---|---|
| 0 | 2 | 6 |
| 1 | 4 | 4 |
| 2 | 6 | 3 |
| 3 | 6 | 4 |
| 4 | 7 | 2 |
| 5 | 8 | 1 |
| 6 | 3 | 5 |

It can be understood from Table 1 that the seven TDD configurations 0 to 6 defined in the LTE (TS36.211 Table 4.2-2) are not arranged in order of the number of downlink sub frames or the number of uplink sub frames. Here, Table 2 represents that the configurations 0 to 6 are rearranged in the ascending order of the number of downlink sub frames and the descending order of the number of uplink sub frames.

TABLE 2

| Configuration | Number of downlink sub frames | Number of uplink sub frames |
|---|---|---|
| 0 | 2 | 6 |
| 6 | 3 | 5 |
| 1 | 4 | 4 |
| 3 | 6 | 4 |
| 2 | 6 | 3 |
| 4 | 7 | 2 |
| 5 | 8 | 1 |

Here, the seven TDD configurations 0 to 6 defined in the LTE (TS36.211 Table 4.2-2) illustrated in FIG. 20 are rearranged in the ascending order of the number of downlink sub frames and the descending order of the number of uplink sub frames according to Table 2. The result is illustrated in FIG. 1.

When different TDD configurations are used in neighboring eNodeBs, the configurations are assumed to be changed between neighboring eNodeBs only in the order illustrated in FIG. 1 (that is, only in the order of the serial numbers 0, 6, 1, 3, 2, 4, and 5). In this case, configurations used by neighboring eNodeBs have a combination (that is, one of combinations of the serial numbers 0 and 6, 6 and 1, 1 and 3, 3 and 2, 2 and 4, and 4 and 5) of configurations vertically adjacent to each other in FIG. 1. Between neighboring cells, the ratio of the uplink and the downlink in the radio frame gently changes.

When different TDD configurations are used in neighboring eNodeBs, it is likely that in the sub frame #3, #4, and #6 to #9, the uplink and the downlink are mismatched, and thus interference occurs. In FIG. 2, sub frames in which the uplink and the downlink are mismatched between configurations vertically adjacent to each other in FIG. 1 are surrounded by thick lines. Referring to FIG. 2, between the configuration 0 and the configuration 6, since the uplink and the downlink are mismatched only in the sub frame #9, only one sub frame is likely to cause interference. The number of sub frames causing interference between configurations vertically adjacent to each other in FIG. 1 (that is, combinations of configurations of the serial numbers 0 and 6, 6 and 1, 1 and 3, 3 and 2, 2 and 4, and 4 and 5) is represented by the following Table 3.

TABLE 3

| Combinations of adjacent configurations | Number of sub frames causing interference |
|---|---|
| 0-6 | 1 |
| 6-1 | 1 |
| 1-3 | 4 |
| 3-2 | 4 |
| 2-4 | 3 |
| 4-5 | 1 |

Referring to Table 3, it can be understood that when configurations of combinations of the serial numbers 1 and 3, 3 and 2, and 2 and 4 are used between neighboring eNodeBs, the number of sub frames causing interference is large. Therefore, when different TDD configurations are used in neighboring eNodeBs, if configurations used by neighboring eNodeBs have one of combinations of 1 and 3, 3 and 2, and 2 and 4, there is a problem in that interference is large.

Figure 3:
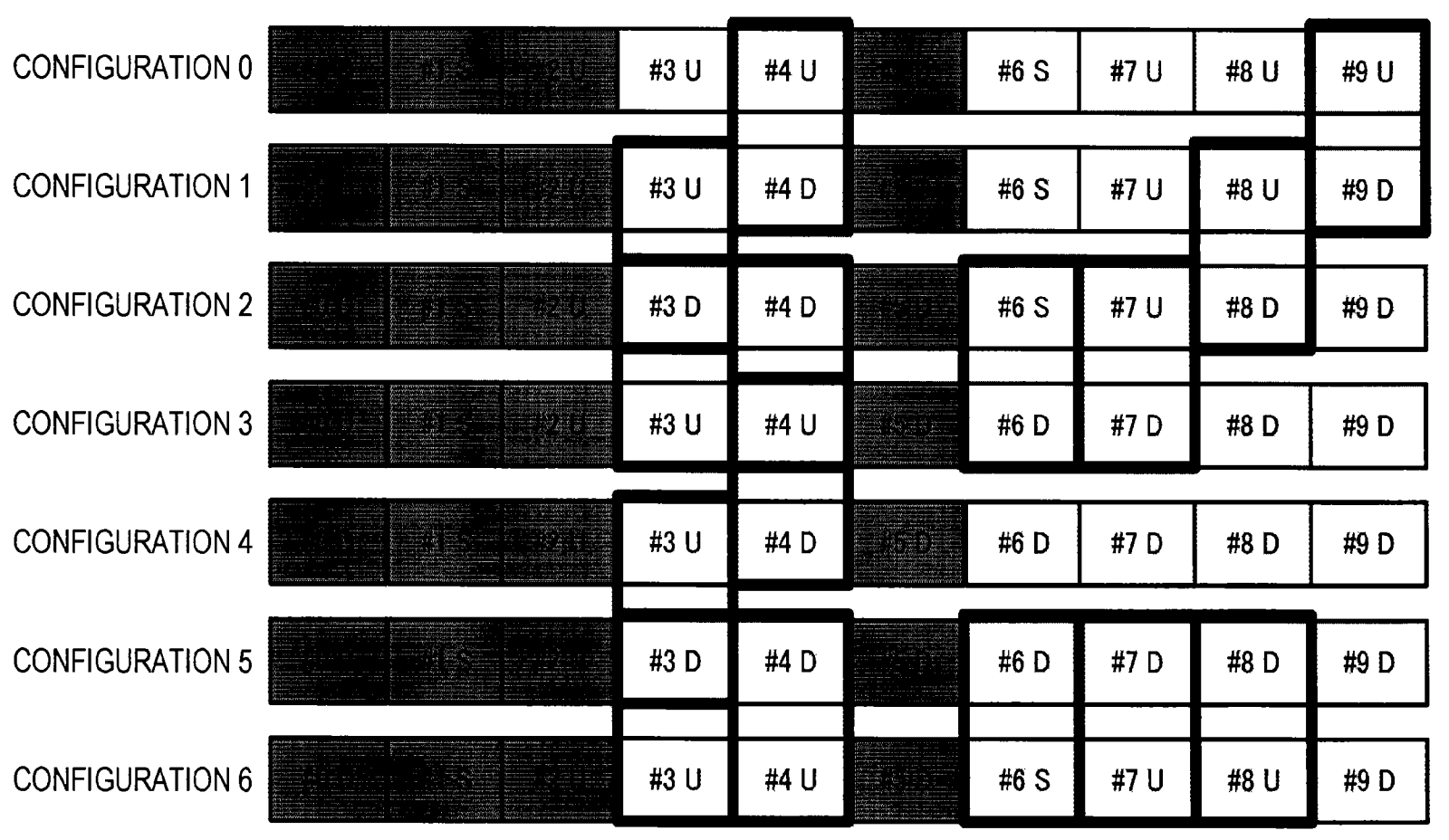

For the sake of comparison, an example in which the above-described rearranging of the configurations is not performed, and sub frames in which the uplink and the downlink are mismatched between configurations vertically adjacent to each other in FIG. 20 are surrounded by thick lines is illustrated in FIG. 3. The following Table 4 represents the number of sub frames causing interference between configurations vertically adjacent to each other in FIG. 20 (combinations of configurations of the serial numbers 0 and 1, 1 and 2, 2 and 3, 3 and 3, 4 and 5, and 5 and 6).

TABLE 4

| Combinations of adjacent configurations | Number of sub frames causing interference |
|---|---|
| 0-1 | 2 |
| 1-2 | 2 |
| 2-3 | 4 |
| 3-4 | 1 |
| 4-5 | 1 |
| 5-6 | 5 |

Referring to Table 4, it can be understood that when configurations of a combination of the serial numbers 2 and 3 or 5 and 6 are used in neighboring cells, the number of sub frames causing interference is large. When FIG. 2 and Table 3 are compared with FIG. 3 and Table 4, respectively, as the configurations are rearranged in the ascending order of the number of downlink sub frames and the descending order of the number of uplink sub frames, the number of sub frames causing interference between adjacent configurations decreases. Since a maximum number of sub frames causing interference between adjacent configurations is reduced through the rearrangement of the configurations, the throughput of a cell may not be significantly reduced.

Until now, the description has been made focusing on a sub frame causing interference in a radio frame when different TDD configurations are used in neighboring eNodeBs. In the following, a technique of avoiding interference in a sub frame in which interference occurs will be further described.

In the past, techniques of removing interference when interference occurs by a method of adjusting transmission output of a transmitter causing interference, a method of stopping transmission of a transmitter, a method of dividing sub carriers in the frequency direction and performing multiplexing, or the like have been known. On the other hand, an embodiment disclosed in the present disclosure does not focus attention on a method of removing interference. For example, in the 3GPP Rel 10, in order to reduce influence of interference between neighboring cells, ABS (Almost Blank Sub frame) is specified as ICIC (InterCell Interference Coordination). A method of further avoiding interference an ABS will be described below.

An almost blank sub frame (ABS) is a technique of stopping transmission of user data, and for example, a specific sub frame of an eNodeB causing interference is used as an ABS. Even when transmission of user data stops, a reference signal slightly remains. A method of stopping the reference signal has been proposed as well. Ultimately, the ABS is a simple interference avoiding technique of stopping transmission when interference occurs.

Referring back to Table 3, when the configurations are rearranged in view of an increase in the number of downlink sub frames and a decrease in the number of uplink sub frames, the number of sub frames causing interference increases in the combinations of the configurations of the serial numbers 1 and 3, 3 and 2, and 2 and 4. When an ABS is used as inter-cell interference coordination (ICIC), any one of neighboring eNodeBs stops transmission in a sub frame causing interference. Therefore, when any one of combinations of the configurations of the serial numbers 1 and 3, 3 and 2, and 2 and 4 is used in neighboring eNodeBs, the throughput of a cell is significantly reduced.

FIG. 1 and Table 2 represent a result of rearranging the seven TDD configurations 0 to 6 defined in the LTE (TS36.211 Table 4.2-2) in the ascending order of the number of downlink sub frames and the descending order of the number of uplink sub frames. Here, an attempt to rearrange the configurations 0 to 6 preferentially in the ascending order of the number of downlink sub frames rather than the descending order of the number of uplink sub frames has been made. Specifically, the configurations 2 and 3 which are the same in the number of downlink sub frames in FIG. 1 and Table 2 are switched as illustrated in FIG. 4 and the following Table 5. In the example illustrated in Table 5, the arrangement is made in the ascending order of the number of downlink sub frames while the descending order of the number of uplink sub frames is not kept.

TABLE 5

| Configuration | Number of downlink sub frames | Number of uplink sub frames |
|---|---|---|
| 0 | 2 | 6 |
| 6 | 3 | 5 |
| 1 | 4 | 4 |
| 2 | 6 | 2 |
| 3 | 6 | 3 |
| 4 | 7 | 2 |
| 5 | 8 | 1 |

Figure 5:
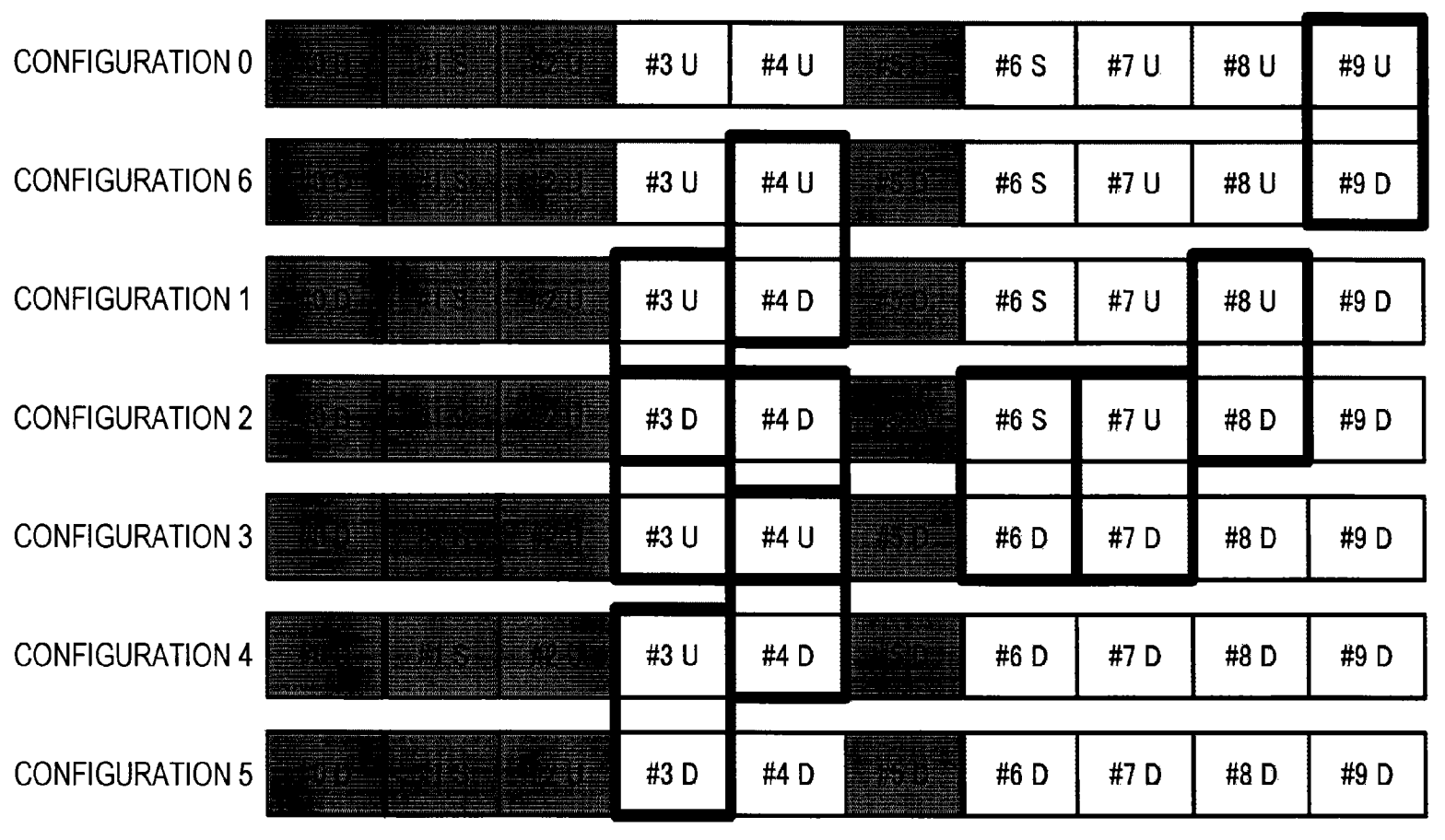

In FIG. 5, sub frames in which the uplink and the downlink are mismatched between configurations vertically adjacent to each other in FIG. 4 are surrounded by thick lines. The following Table 6 represents the number of sub frames causing interference between the configurations vertically adjacent to each other in FIG. 4 (that is, combinations of configurations of the serial numbers 0 and 6, 6 and 1, 1 and 2, 2 and 3, 3 and 4, and 4 and 5).

TABLE 6

| Combinations of adjacent configurations | Number of sub frames causing interference |
|---|---|
| 0-6 | 1 |
| 6-1 | 1 |
| 1-2 | 2 |
| 2-3 | 4 |
| 3-4 | 1 |
| 4-5 | 1 |

When FIG. 2 and Table 3 are compared with FIG. 5 and Table 6, respectively, as the configurations 0 to 6 are rearranged preferentially in the ascending order of the number of downlink sub frames rather than the descending order of the number of uplink sub frames, the number of sub frames causing interference may be further reduced.

However, referring to Table 6, when a combination of the configurations 2 and 3 is used in neighboring eNodeBs, the number of sub frames causing interference is still large, that is, four. Therefore, when an ABS is used as ICIC and cells using the configurations 2 and 3 are adjacent to each other, an eNodeB of any one cell stops transmission in a sub frame causing interference, and thus the throughput of a cell is significantly reduced.

The reason why there are many sub frames causing interference between the configurations 2 and 3 in the arrangement of the configurations illustrated in FIG. 4 is because uplink allocations and downlink allocations of sub frames significantly change between the two configurations. In this regard, a method of defining a new configuration in which uplink allocations and downlink allocations of sub frames gently change from the configuration 2 or uplink allocations and downlink allocations of sub frames gently change to the configuration 3, and inserting the new configuration between the configurations 2 and 3 is considered. As the newly defined configuration is inserted between the configurations 2 and 3, it is expected that a phenomenon that the uplink and the downlink are mismatched is mitigated, the number of sub frames which are subjected to ABSs in each cell is reduced, and deterioration in the throughput of each cell is prevented.

FIG. 6 illustrates an example in which a new configuration is defined and inserted between the configurations 2 and 3 in the configuration arrangement illustrated in FIG. 4. Basically, a configuration to be newly defined is one in which uplink and downlink allocations of sub frames are decided so that four sub frames in which a mismatch of the uplink and the downlink, that is, interference occurs between the configurations 2 and 3 undergo two interferences between the configuration 2 and the new configuration and between the new configuration and the configuration 3. Sub frames which interfere with each other between the configurations 2 and 3 are dispersed into sub frames which interfere with each other between each of the configurations 2 and 3, and the newly defined configuration.

Therefore, since uplink and downlink allocations of four sub frames that interfere with each other between the configurations 2 and 3 have $_4C_2$ (=6) combinations, there are six types of configurations including a configuration illustrated in FIG. 6 as configurations to be newly configured. Preferably, among the six types, a new configuration is defined so that downlink and the uplink sub frame are most seamlessly connected from the configuration 2 to the configuration 3. A very ideal configuration depends even on an arrangement of an ABS. An arrangement of an ABS will be described later.

Figure 7:
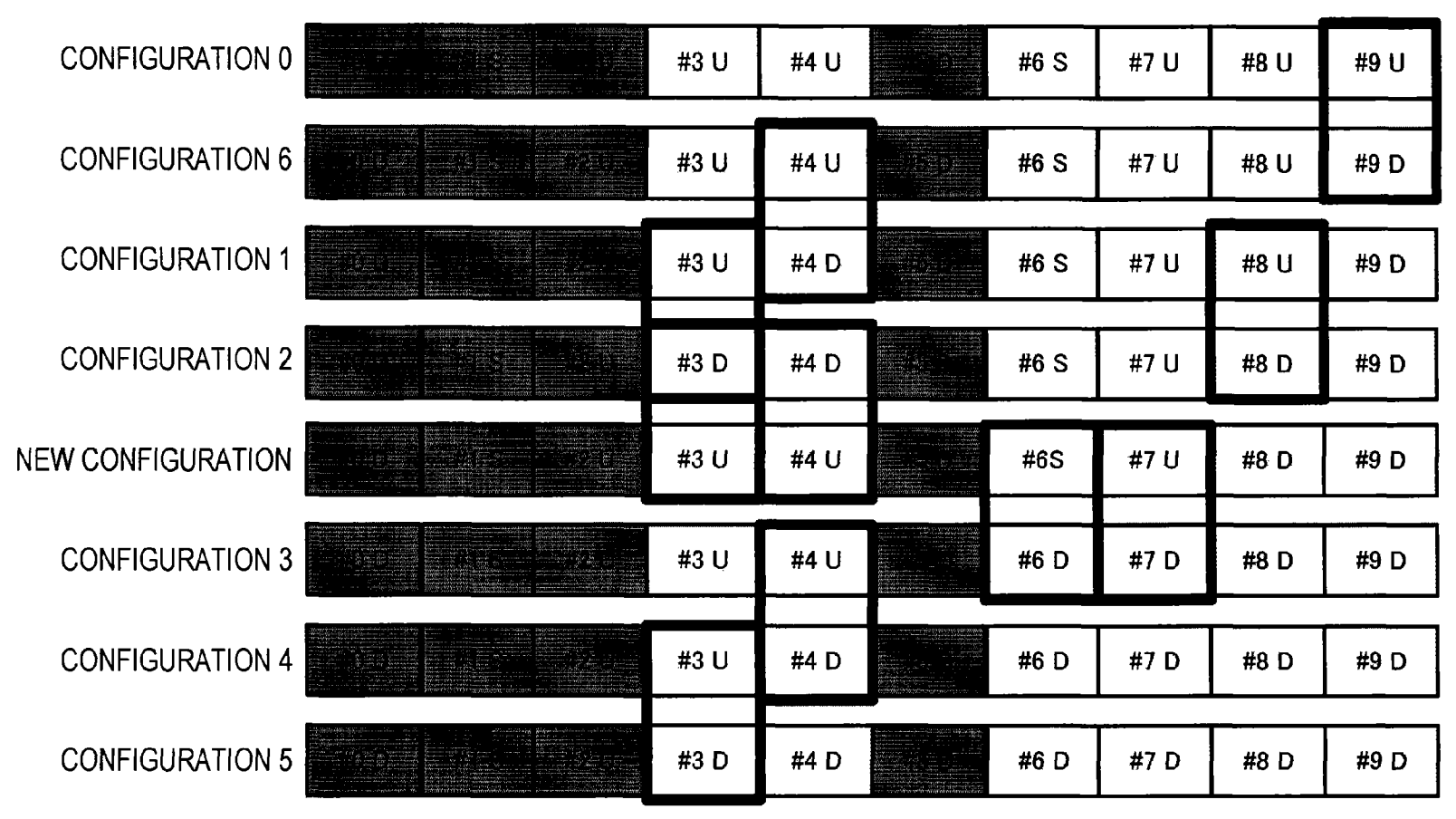

FIG. 7 illustrates sub frames in which the uplink and the downlink are mismatched between configurations vertically adjacent to each other in FIG. 6 are surrounded by thick lines. The following Table 7 represents the number of sub frames causing interference between configurations vertically adjacent to each other in FIG. 6.

TABLE 7

| Combinations of adjacent configurations | Number of sub frames causing interference |
| --- | --- |
| 0-6 | 1 |
| 6-1 | 1 |
| 1-2 | 2 |
| 2-new configuration | 2 |
| new configuration-3 | 2 |
| 3-4 | 1 |
| 4-5 | 1 |

When FIG. 5 and Table 6 are compared with FIG. 7 and Table 7, respectively, it can be understood that the number of sub frames causing interference is further reduced by inserting a newly defined configuration. Referring to Table 7, a maximum of the number of sub frames that interferes with each other between adjacent configurations is two, and deterioration in the throughput of each cell can be prevented by reducing the number of sub frames which are subjected to ABSs in each cell.

As described above, when different configurations are set in neighboring cells, sub frames that interfere with each other occur because the uplink and the downlink are mismatched. When it is possible to specify sub frames that interfere with each other, a decision of a cell in which transmission of a sub frame is to be stopped, that is, a setting of an ABS is problematic. It is because when an ABS is concentrated in one of neighboring cells, the throughput of the cell significantly deteriorates.

Figure 8:
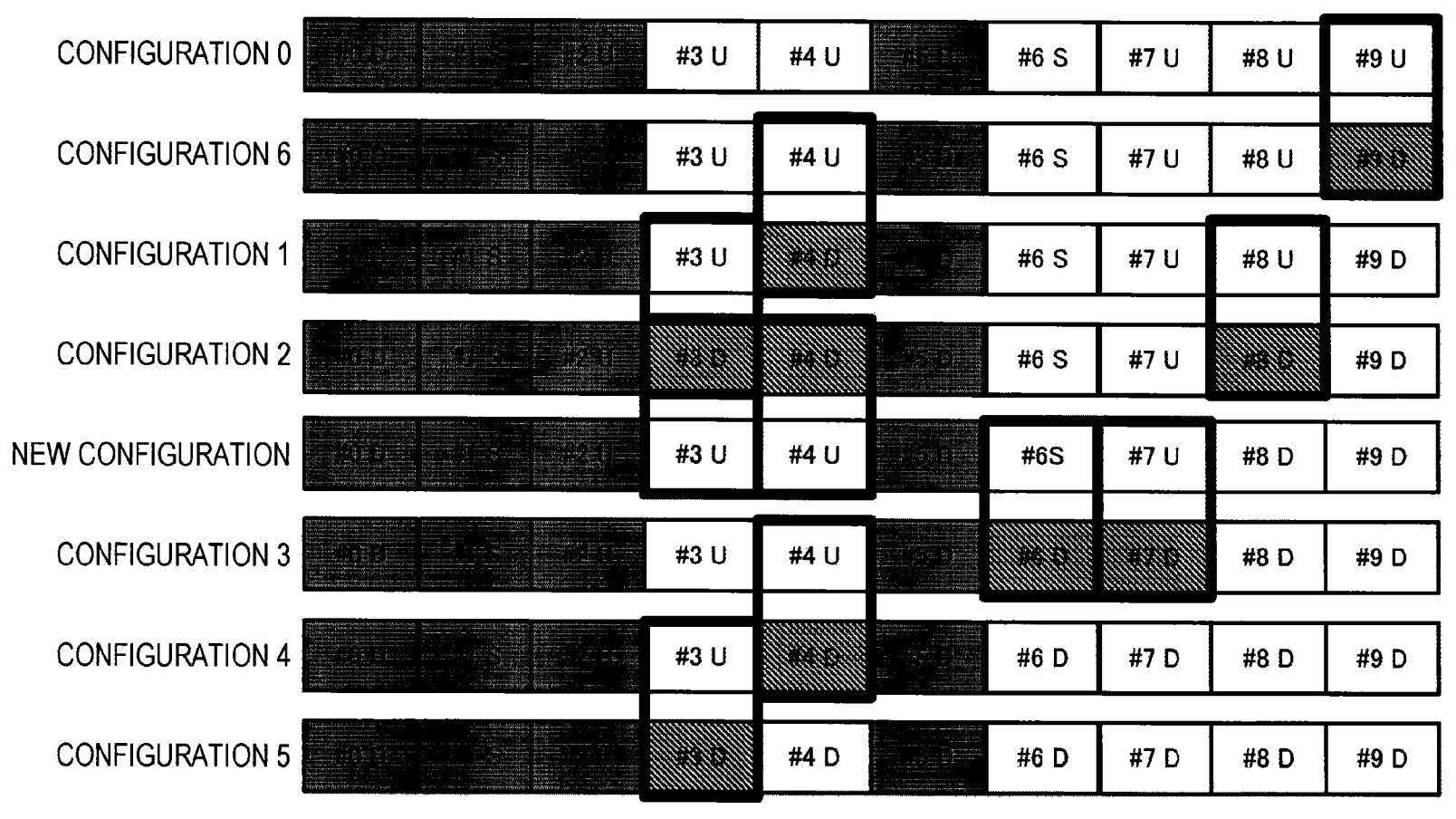

FIG. 8 illustrates an example in which interference is avoided by stopping the transmission of an eNodeB of the downlink, that is, arranging an ABS in sub frames specified to have a mismatched uplink or downlink (that is, interfere with each other) between configurations adjacent to each other in FIG. 7. In FIG. 8, portions in which downlink transmission of a base station is stopped (that is, an ABS is arranged) are indicated by hatching.

When a setting of an ABS is made so that downlink transmission of an eNodeB is stopped, ABSs are likely to be concentrated in one of neighboring cells. In the example illustrated in FIG. 8, the number of sub frames in which an ABS is arranged in each configuration is represented in the following Table 8. In this case, since the ABS is concentrated in the configuration 2, the throughput of a cell to which the configuration 2 is set is significantly reduced. Further, it is understood that the ratio of the downlink and the uplink is not gently changed in the order of the configurations illustrated in FIG. 8.

TABLE 8

| Configuration | Number of sub frames in which ABS is arranged |
| --- | --- |
| 0 | 0 |
| 6 | 1 |
| 1 | 1 |
| 2 | 3 |
| new configuration | 0 |
| 3 | 2 |
| 4 | 1 |
| 5 | 1 |

In this regard, a method of allocating an ABS so that ABSs are not concentrated in some configurations is further reviewed. In the example illustrated in FIG. 8, an ABS is arranged in a cell allocated to the downlink in a sub frame in which interference has occurred. On the other hand, a setting can be made so that ABSs are not concentrated in some configurations by allowing an ABS to be arranged even in a cell allocated to the uplink. Therefore, in sub frames in which the uplink and the downlink are mismatched between configurations adjacent to each other, the ABS can be set for both the uplink and the downlink.

Figure 9:
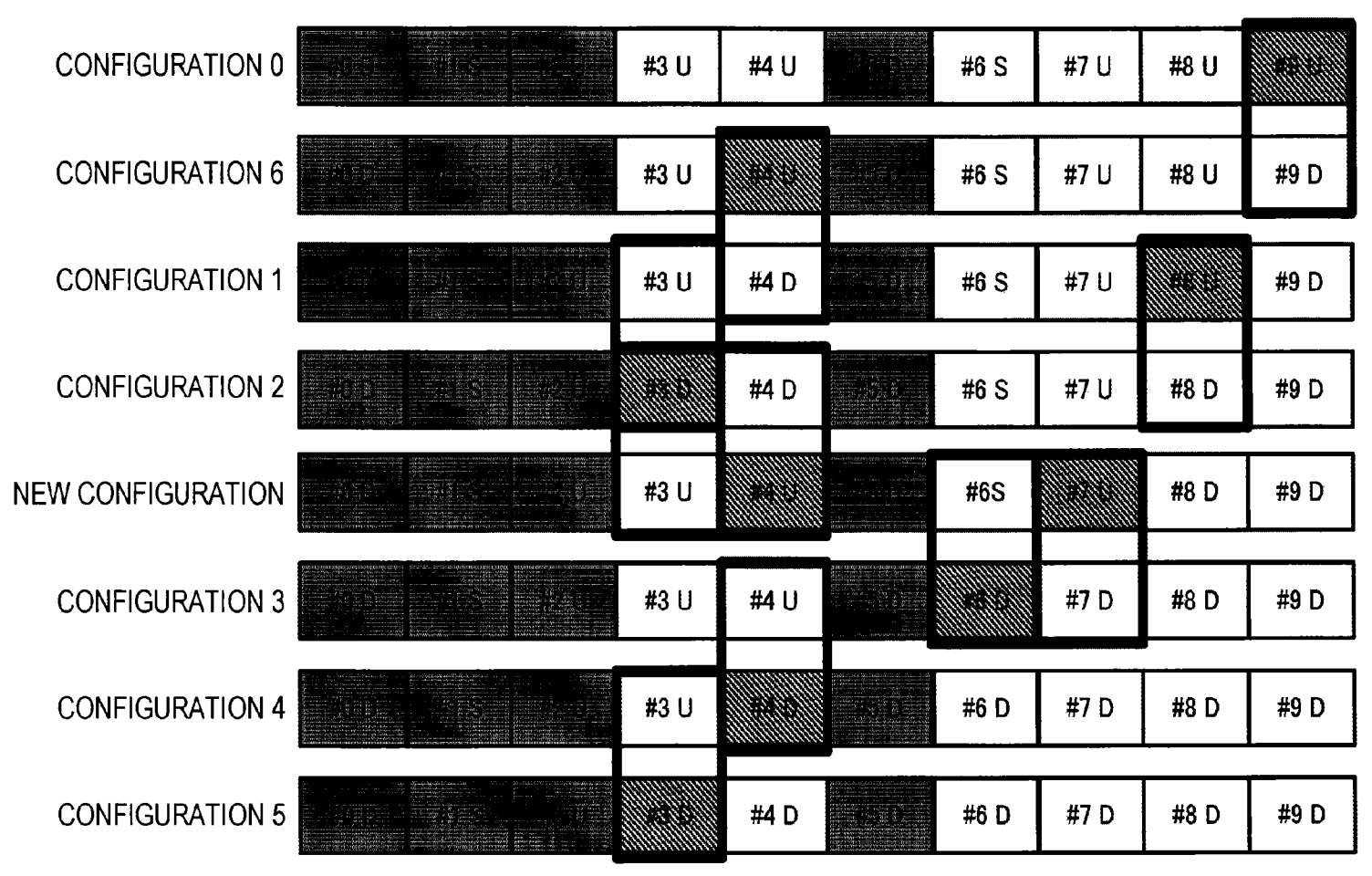

FIG. 9 illustrates an example in which ABSs are arranged in sub frames specified to have a mismatched uplink and downlink (that is, to interfere with each other) between configurations adjacent to each other in FIG. 7 so that the ABSs are not concentrated in some configurations. In FIG. 9, portions in which the ABSs are arranged are indicated by hatching. In the example illustrated in FIG. 8, an ABS is arranged only in a downlink sub frame, but a setting can be made so that ABSs are not concentrated in some configurations by flexibly arranging an ABS either uplink or downlink sub frame as illustrated in FIG. 9. The following Table 9 represents the number of sub frames in which an ABS is arranged in each configuration in the example illustrated in FIG. 9.

TABLE 9

| Configuration | Number of sub frames in which ABS is arranged |
|---|---|
| 0 | 1 |
| 6 | 1 |
| 1 | 1 |
| 2 | 1 |
| new configuration | 2 |
| 3 | 1 |
| 4 | 1 |
| 5 | 1 |

Further, when different configurations are used in neighboring cells, if traffics of each cell are imbalanced, an ABS may be set in each sub frame in which interference has occurred according to the imbalance.

In the examples illustrated in FIGS. 8 and 9, in sub frames in which the uplink and the downlink are mismatched between configurations adjacent to each other, an ABS is set to any one cell. As an ABS is set, interference can be avoided, and the ABS can be dispersedly arranged in the respective configurations, but in any case, when the ABS is arranged, the throughput of a cell deteriorates. Therefore, it is desirable to reduce the number of ABSs to be set.

Figure 10:
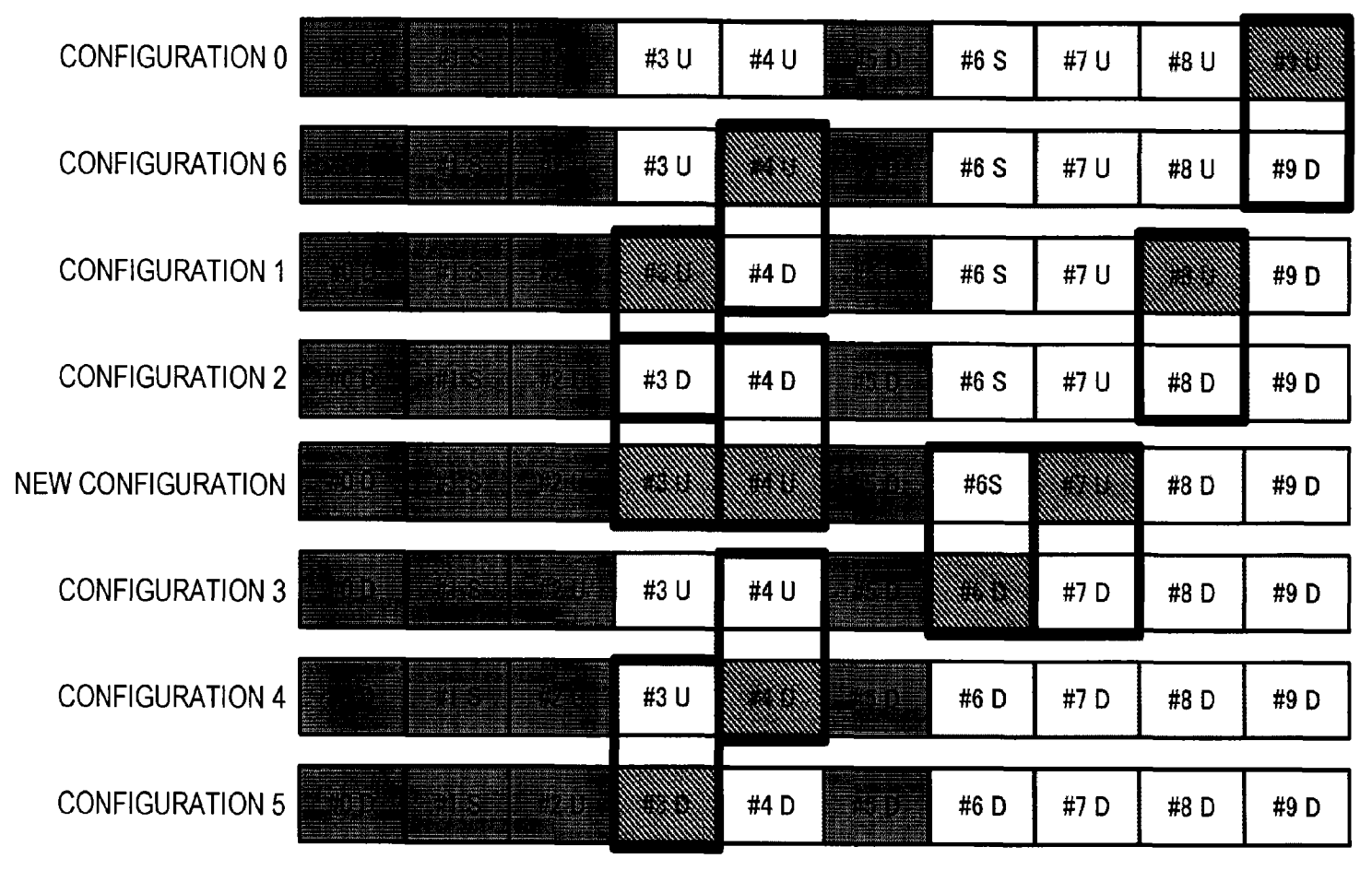

FIG. 10 illustrates another example in which ABSs are arranged in sub frames specified to have interference with each other between configurations adjacent to each other in FIG. 7. Further, in the example illustrated in FIG. 10, the number of sub frames in which an ABS is arranged in each configuration is represented by the following Table 10.

TABLE 10

| Configuration | Number of sub frames in which ABS is arranged |
|---|---|
| 0 | 1 |
| 6 | 1 |
| 1 | 2 |
| 2 | 0 |
| new configuration | 3 |
| 3 | 1 |
| 4 | 1 |
| 5 | 1 |

FIG. 10 illustrates an example in which an ABS is allowed to be set to both the uplink and the downlink, similarly to FIG. 9. As can be seen from FIG. 7, in the configuration arrangement illustrated in FIG. 6, interference occurs in the sub frames #3 in three configurations, which are the configurations 1, 2, and the newly defined configuration. When both cells adjacent to a cell using the configuration 2 use the configuration 1 and a newly defined configuration, respectively, the cell using the configuration 2 interferes with both adjacent cells in the sub frame #3. In the example illustrated in FIG. 10, ABSs are arranged in both adjacent cells in order to avoid interference in sub frames in which a certain cell interferes with both of the adjacent cells. In other words, since two adjacent cells are sacrificed in order to relieve a single cell of interference, and thus it is not efficient.

Therefore, in sub frames in which a certain cell interferes with both adjacent cells using different configurations, by arranging an ABS in the cell rather than both adjacent cells, and thus interference between both adjacent cells can be avoided, and thus it is more preferable. Unlike FIG. 10, in the example illustrated in FIG. 9, an ABS is arranged in the sub frame #3 of the configuration 2, and interference can be avoided between the sub frames #3 of both of the configuration 1 and the newly defined configuration which are adjacent to each other, and thus it is more preferable.

Additionally, as a configuration is newly defined, the number of ABSs to be set can be reduced.

FIG. 4 illustrates the result of revising the configuration arrangement so that the configurations are arranged in both the ascending order of the number of downlink sub frames and the descending order of the number of uplink sub frames, and then revising the configuration arrangement so that the configurations are arranged preferentially in the ascending order of the number of downlink sub frames rather than the descending order of the number of uplink sub frames.

On the contrary, FIG. 11 illustrates a result of revising the configuration arrangement so that the configurations are arranged preferentially in the descending order of the number of uplink sub frames rather than the ascending order of the number of downlink sub frames. Specifically, as illustrated in FIG. 11 and the following Table 11, the configurations 2 and 4 which are the same in the number of downlink sub frames in FIG. 1 and Table 2 are switched.

TABLE 11

| Configuration | Number of downlink sub frames | Number of uplink sub frames |
|---|---|---|
| 0 | 2 | 6 |
| 6 | 3 | 5 |
| 1 | 4 | 4 |
| 3 | 6 | 3 |
| 4 | 7 | 2 |
| 2 | 6 | 2 |
| 5 | 8 | 1 |

FIG. 12 illustrates an example in which sub frames in which the uplink and the downlink are mismatched between configurations vertically adjacent to each other in FIG. 11 are surrounded by thick lines. The following Table 12 represents the number of sub frames causing interference between configurations vertically adjacent to each other in FIG. 11 (in combinations of configurations having serial numbers 0 and 6, 6 and 1, 1 and 3, 3 and 4, 4 and 2, and 2 and 5.)

TABLE 12

| Combinations of adjacent configurations | Number of sub frames causing interference |
|---|---|
| 0-6 | 1 |
| 6-1 | 1 |
| 1-3 | 4 |
| 3-4 | 1 |
| 4-2 | 3 |
| 2-5 | 2 |

When Table 12 is compared with Table 3, it can be understood that the number of sub frames causing interference is reduced. For example, in Table 3, there are two combinations of adjacent configurations in which the number of sub frames causing interference is four, whereas in Table 12, the number of combinations of adjacent configurations in which the number of sub frames causing interference is reduced to one. Therefore, the same effects can be obtained even by the method of newly rearranging the configurations so that the configurations are arranged preferentially in the descending order of the number of uplink sub frames rather than the ascending order of the number of downlink sub frames.

FIG. 13 illustrates an example in which a new configuration is defined and inserted between the configurations 1 and 3 in the configuration arrangement illustrated in FIG. 11.

Basically, the configuration to be newly defined is one in which uplink and downlink allocations of sub frames are decided so that four sub frames in which a mismatch of the uplink and the downlink, that is, interference occurs between the configurations 1 and 3 undergo two interferences between the configuration 1 and the new configuration and between the new configuration and the configuration 3.

Since uplink and downlink allocations of four sub frames that interfere with each other between the configurations 1 and 3 have $_4C_2$ (=6) combinations, there are six types of configurations including a configuration illustrated in FIG. 13 as configurations to be newly configured. Preferably, among the six types, a new configuration is defined so that downlink and the uplink sub frame are most seamlessly connected from the configuration 1 to the configuration 3.

Figure 14:
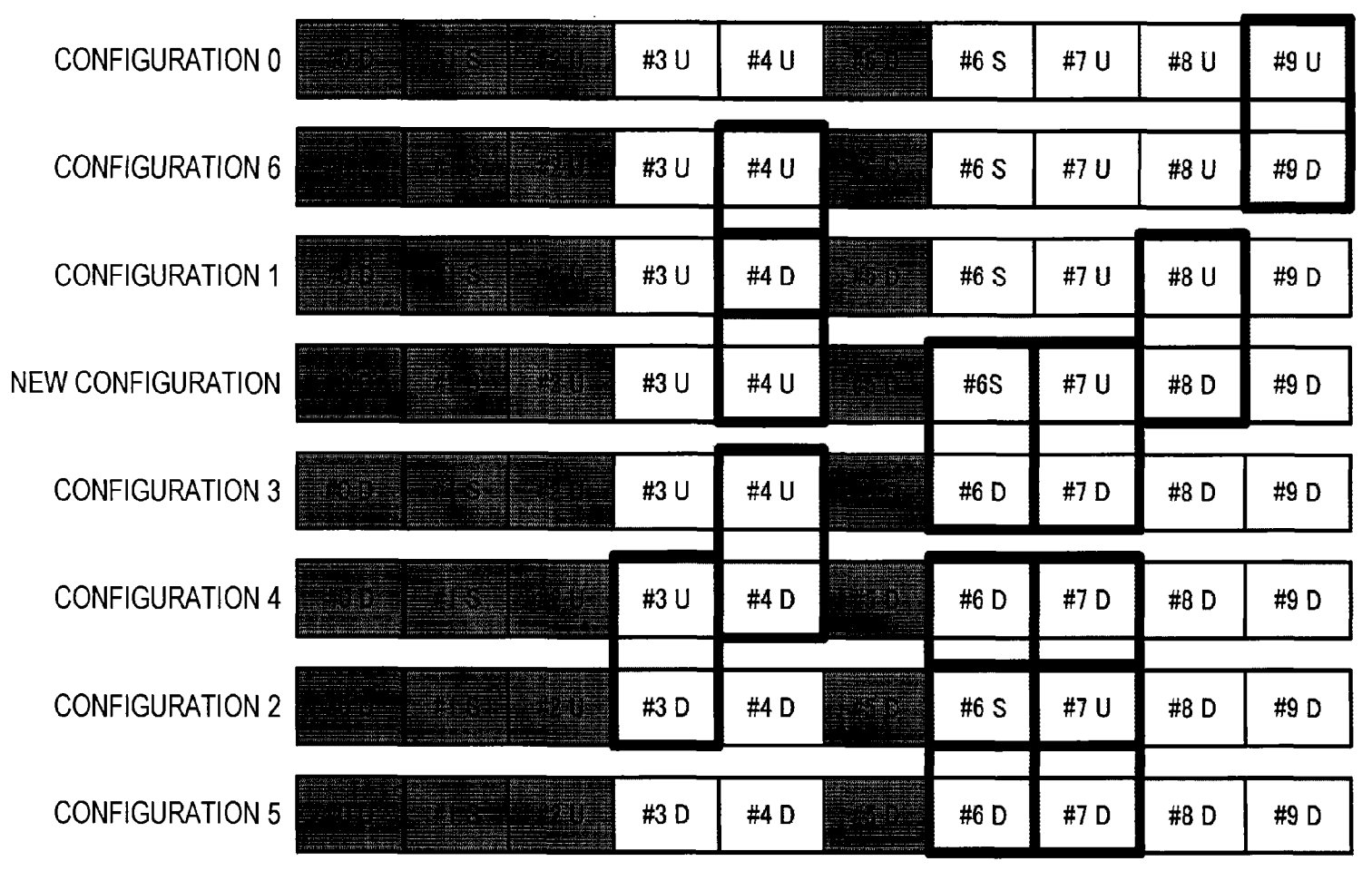

FIG. 14 illustrates an example in which sub frames in which the uplink and the downlink are mismatched between configurations vertically adjacent to each other in FIG. 13 are surrounded by thick lines. The following Table 13 represents the number of sub frames causing interference between configurations vertically adjacent to each other in FIG. 13.

TABLE 13

| Combinations of adjacent configurations | Number of sub frames causing interference |
|---|---|
| 0-6 | 1 |
| 6-1 | 1 |
| 1-new configuration | 2 |
| new configuration-3 | 2 |
| 3-4 | 1 |
| 4-2 | 3 |
| 2-5 | 2 |

Figure 15:
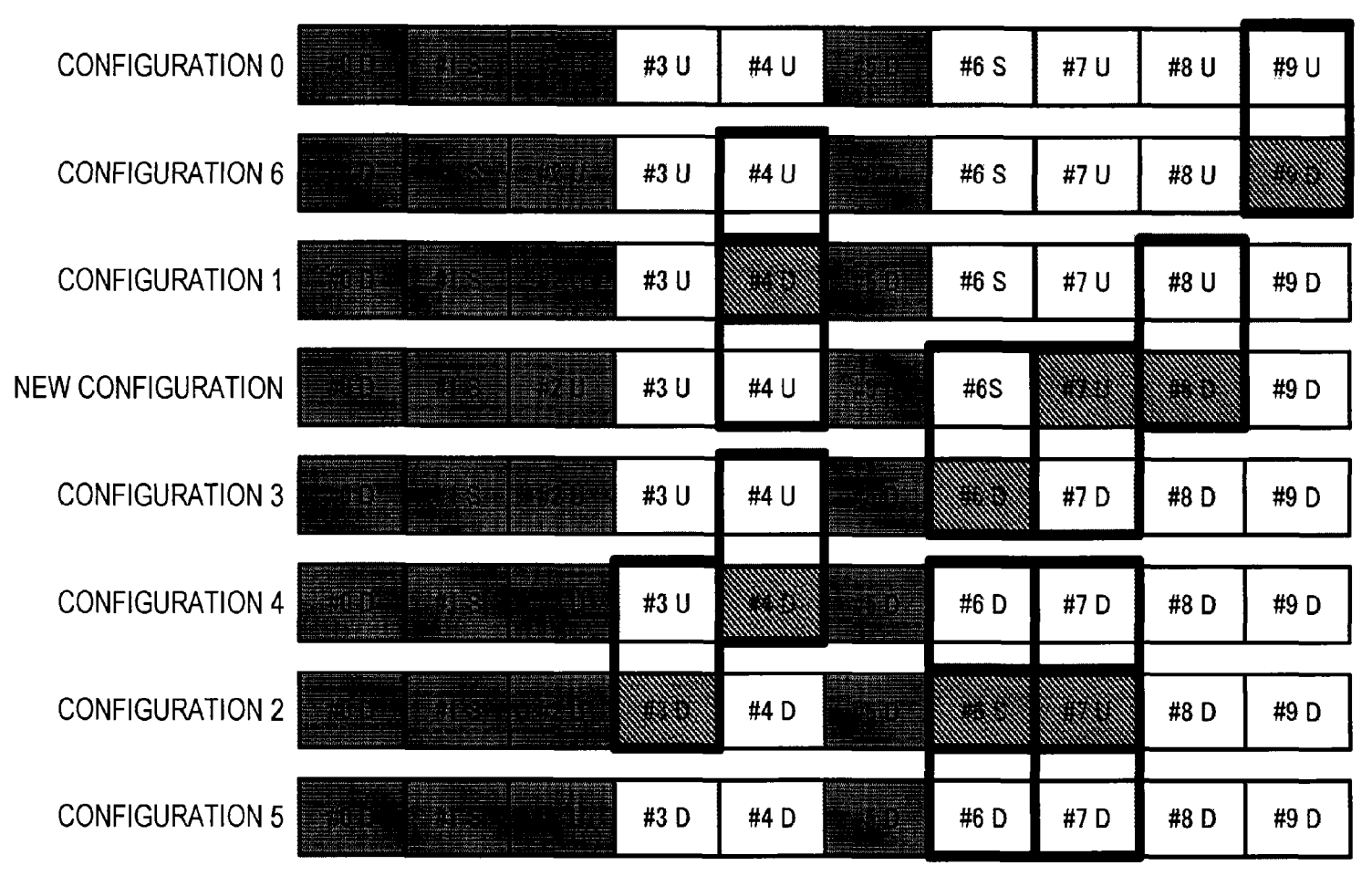

FIG. 15 illustrates an example in which interference is avoided in sub frames specified to have a mismatched uplink and downlink (to interfere with each other) between configurations adjacent to each other by arranging ABSs in FIG. 14. In FIG. 15, portions in which an ABS is arranged are indicated by hatching. In FIG. 15, ABS are arranged not to be concentrated on some configuration. Further, in sub frames in which a certain cell interferes with both adjacent cells using different configurations, an ABS is arranged is arranged in the cell (same as above).

The examples illustrated in FIG. 4 and Table 5 represent a result of revising the configuration arrangement according to the rule in which the configurations are arranged preferentially in the ascending order of the number of downlink sub frames. Further, the examples illustrated in FIG. 11 and Table 11 represent results of revising the configuration arrangement according to the rule in which the configurations are arranged preferentially in the descending order of the number of uplink sub frames. On the other hand, another method of revising a configuration arrangement is considered other than rule in which the ascending order of the number of downlink sub frames is preferentially considered or rule in which the descending order of the number of downlink sub frames is preferentially considered. It is because that the purpose of reducing interference caused as different configurations are used in neighboring cells and thus the uplink and the downlink are mismatched is not equivalent to the above rules. FIG. 21 and the following Table 14 illustrates an example of a result of revising the arrangement to reduce interference caused as different configurations are used in neighboring cells and thus the uplink and the downlink are mismatched without being limited to the above rules.

TABLE 14

| Configuration | Number of downlink sub frames | Number of uplink sub frames |
|---|---|---|
| 0 | 2 | 6 |
| 6 | 3 | 5 |
| 1 | 4 | 4 |
| 2 | 6 | 3 |
| 5 | 8 | 1 |
| 4 | 7 | 2 |
| 3 | 6 | 4 |

Figure 22:
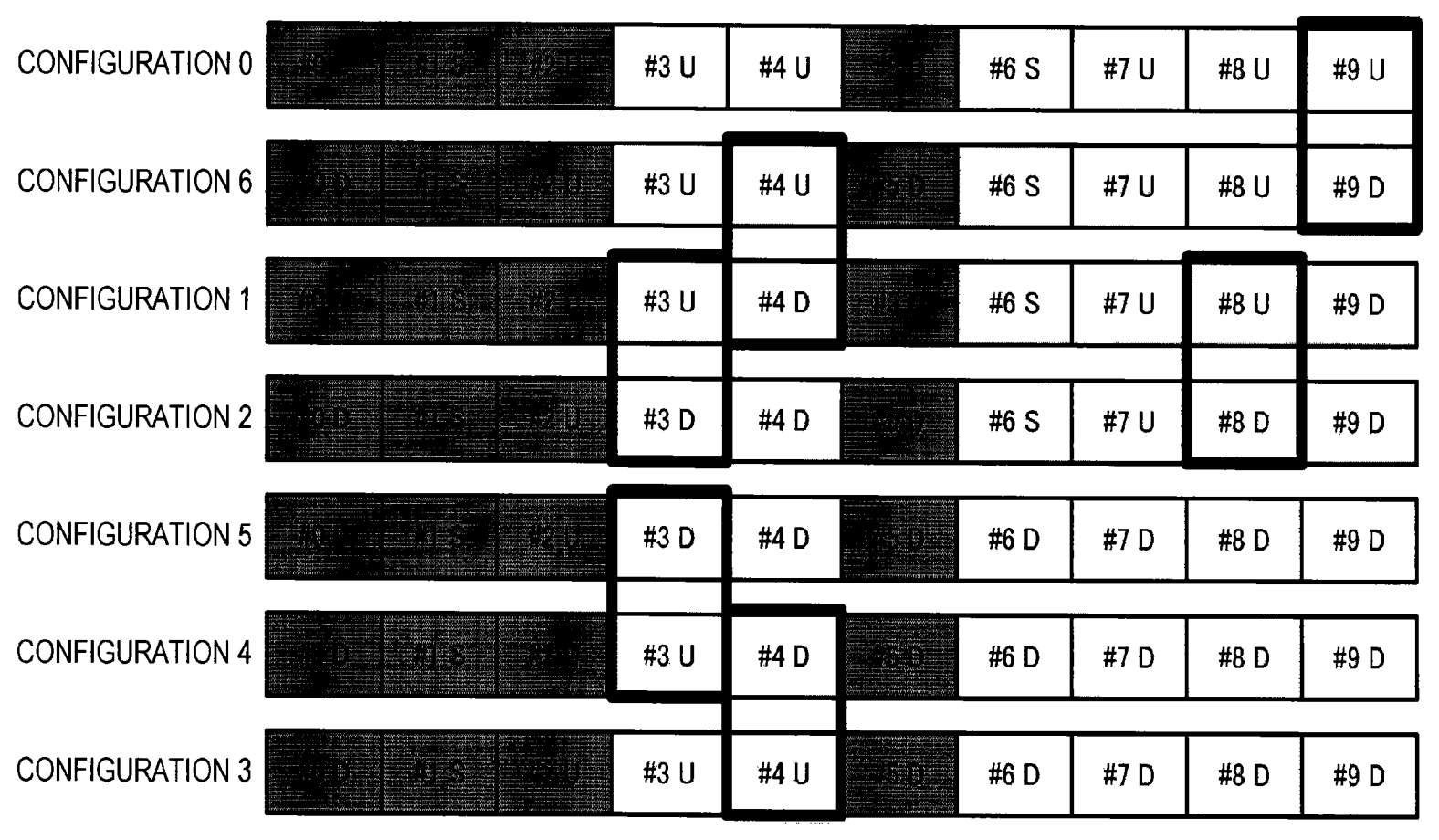

FIG. 22 illustrates an example in which sub frames in which the uplink and the downlink are mismatched between configurations vertically adjacent to each other in FIG. 21 are surrounded by thick lines. The following Table 15 represents the number of sub frames causing interference between configurations vertically adjacent to each other in FIG. 21 (that is, combinations of configurations having the serial numbers 0 and 6, 6 and 1, 1 and 2, 2 and 5, 5 and 4, and 4 and 3).

TABLE 15

| Combinations of adjacent configurations | Number of sub frames causing interference |
|---|---|
| 0-6 | 1 |
| 6-1 | 1 |
| 1-2 | 2 |
| 2-5 | 2 |
| 5-4 | 1 |
| 4-3 | 1 |

For example, according to Table 14, in an area adjacent to an area using the configuration 1, either the configuration 6 or the configuration 2 is used, but the configuration 6 which is smaller in the number of sub frames causing interference is selected with reference to Table 15. Further, when the configurations are the same in the number of sub frames causing interference, selection may be made according to a demand for wireless resources from the area. For example, when a configuration to be used in an area adjacent to an area using the configuration 6 is set, if a downlink sub frame is in great demand in the area, the configuration 1 is selected rather than the configuration 0.

In the cellular communication system, a setting of a configuration and a setting of an ABS in each cell using any configuration described above are practically performed by an MME (mobile management entity) which a core network device.

For example, the MME performs a process of rearranging the seven TDD configurations 0 to 6 defined in the LTE (TS36.211 Table 4.2-2) illustrated in FIG. 20 through the above-described procedure, obtains the arrangement illustrated in FIG. 1 (Table 2), FIG. 4 (Table 5), FIG. 6, FIG. 11 (Table 11), FIG. 13, and FIG. 21 (Table 14), and stores the arrangement in a table or the like. Further, the MME performs an ABS setting of each sub frame when different configurations are set in neighboring cells, and stores information of an ABS setting position. Alternatively, the configuration rearrangement process may be performed by a device other than the MME, and the MME may store the table in which the arrangement illustrated in FIG. 1 (Table 2), FIG. 4 (Table 5), FIG. 6, FIG. 11 (Table 11), FIG. 13, and FIG. 21 (Table 14) is described, which is obtained from an external device. Then, the MME may allocate a configuration used by a cell to each base station (eNodeB) with reference to the table. Further, an ABS setting of each sub frame when different configurations are set in neighboring cells may be also performed by a device other than the MME, and the MME may hold obtained ABS setting information.

In the cellular communication system according to the technology disclosed in the present disclosure, a TDD configuration is considered to be a static setting to a certain extent. In other words, when a setting is made once, a system is operated with the same setting for about one year. Specifically, the operator sets a designed TDD environment to an eNodeB through an MME. Then, the eNodeB is considered to set the information to each terminal (UE) located in a cell through system information or dedicated signaling. However, it is difficult to deny a possibility that a Het-Net (heterogeneous network) environment will make a progress, and a system in which a TDD configuration is followed dynamically according to a change in traffic will appear.

FIG. 16 schematically illustrates a functional configuration of a communication device operating as a base station (eNodeB) in a cellular communication system according to the technology disclosed in the present disclosure.

A configuration holding unit 1607 holds information related to a TDD configuration which is set according to a control signal from an MME (not illustrated) and to be used in its own cell. An ABS setting position holding unit 1608 holds a position of a sub frame which is set according to a control signal from an MME in the configuration to be used in its own cell and subjected to an ABS.

The base station may not set a configuration to be used within its own cell according to a control signal from an MME but may set a configuration to be used in a cell by its own base station and cause the set configuration to be held in the configuration holding unit 1607. For example, the base station may hold a table in which the arrangements illustrated in FIG. 1 (Table 2), FIG. 4 (Table 5), FIG. 6, FIG. 11 (Table 11), FIG. 13, FIG. 21 (Table 14), and the like are described, and when a configuration being used in a neighboring cell is acquired through communication between base stations, the base station may set a configuration to be used in a cell by its own base station with reference to the table.

Further, the base station may not set a position of a sub frame which is subjected to an ABS in its own cell according to a control signal from an MME but may determine whether it subject an ABS in each sub frame in its own cell and cause the determination result to be held in the ABS setting position holding unit 1608. For example, the base station may hold a table in which the arrangements illustrated in FIG. 1 (Table 2), FIG. 4 (Table 5), FIG. 6, FIG. 11 (Table 11), FIG. 13, FIG. 21 (Table 14), and the like are described, and when a configuration being used in a neighboring cell is acquired through communication between base stations, the base station may compare the configuration being used in the neighboring cell with a configuration to be used in its own cell with reference to the table, determine whether an ABS is to be set to each sub frame in its own cell and cause the determination result to be held in the ABS setting position holding unit 1608.

The base station performs uplink or downlink communication through each sub frame of a radio frame according to a TDD configuration held in the configuration holding unit 1607.

The base station receives user data to be transmitted to a terminal (UE) in its own cell through the downlink from a serving gateway. An ABS inserting unit 1605 inserts an ABS to a position of a sub frame held in the ABS setting position holding unit 1608 in each of a PDCCH (Phy Downlink Control Channel) and a PDSCH (Phy Downlink Shared Channel).

A DA converting unit 1603 converts a digital transmission signal into an analog transmission signal. Then, an RF transceiving unit 1602 up-converts the analog transmission signal to an RF band, performs power amplification, and emits a resultant signal to space through an antenna 1601.

Further, when the base station receives an uplink signal transmitted from a terminal (UE) through the antenna 1601, the RF transceiving unit 1602 performs low noise amplification and down-conversion, and an AD converting unit 1604 performs digital conversion.

An ABS detecting unit 1606 detects an ABS from the uplink digital signal at a position of a sub frame held in the ABS setting position holding unit 1608 in each of a PUCCH (Phy Uplink Control Channel) and a PUSCH (Phy Uplink Shared Channel).

Figure 17:
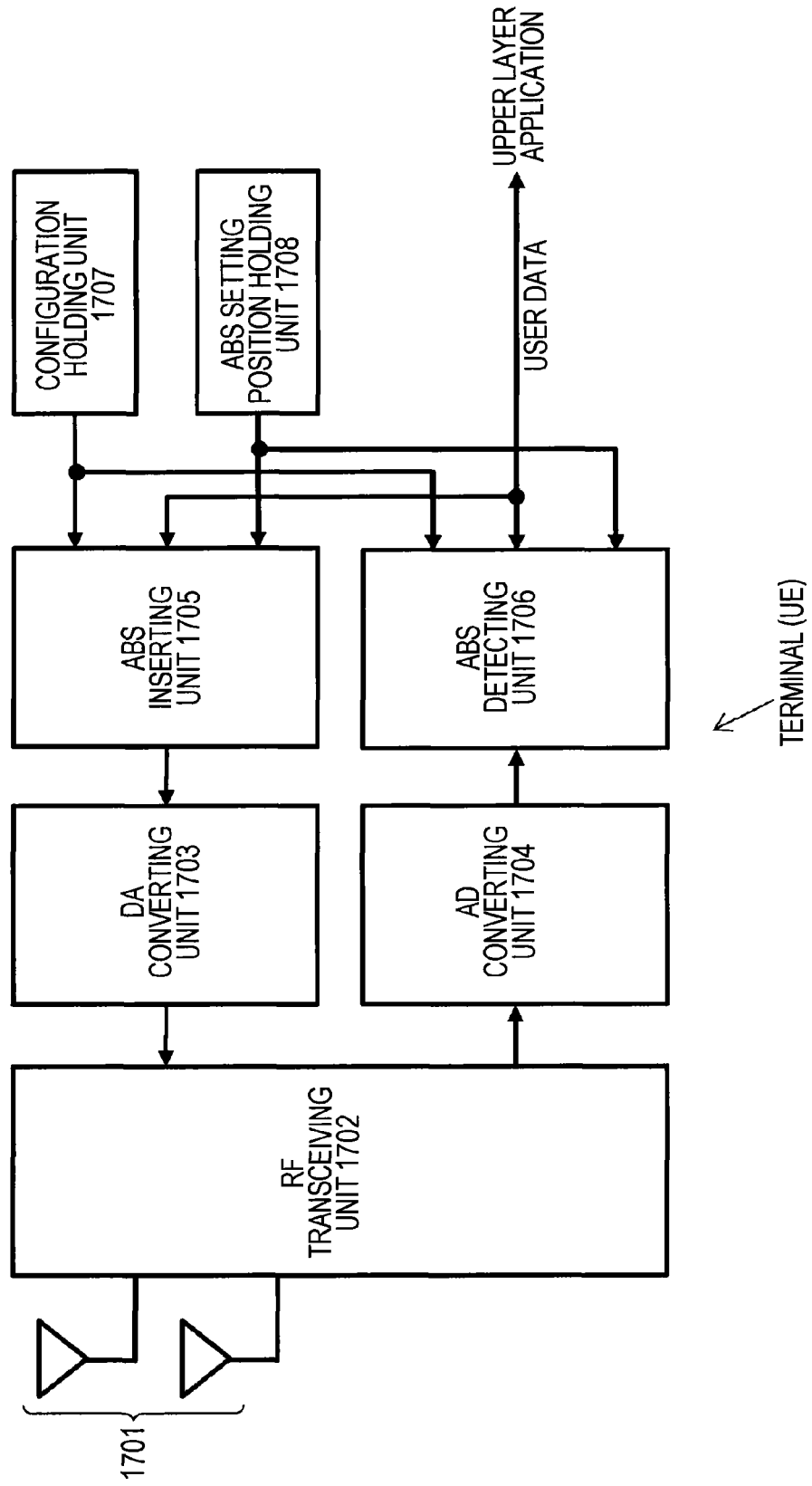
FIG. 17 is a diagram schematically illustrating a functional configuration of a communication device operating as a terminal (UE) in a cellular communication system according to the technology disclosed in the present disclosure.
Figure 23:
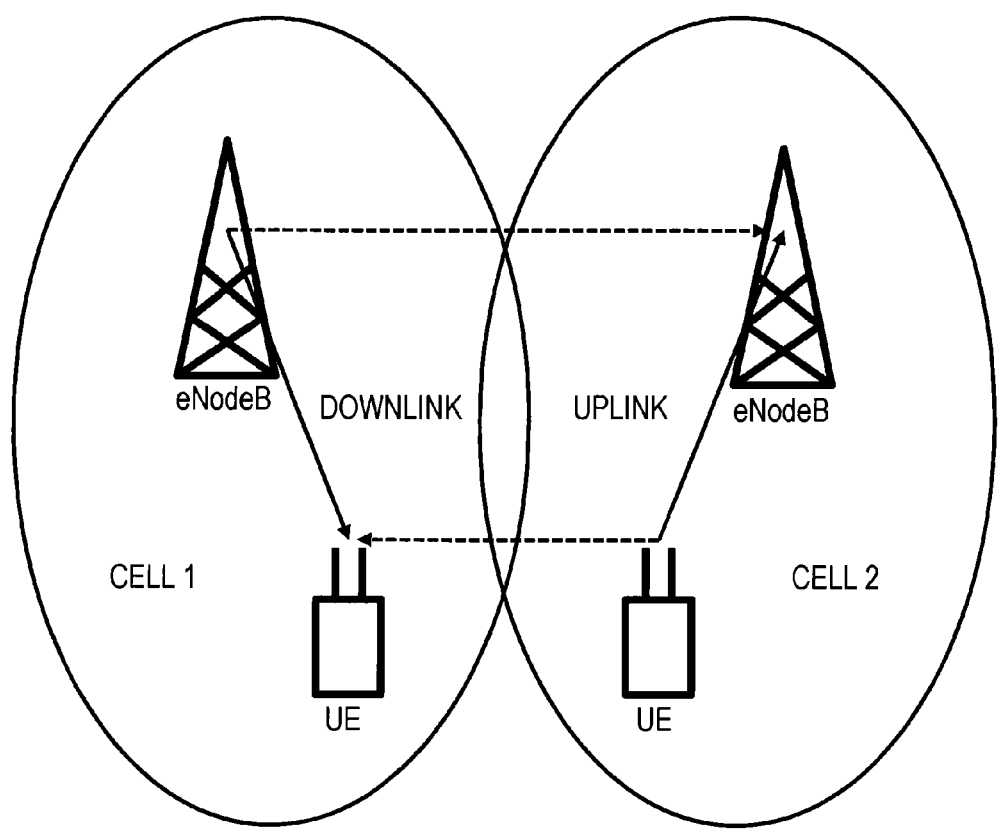
FIG. 23 is a diagram illustrating an example in which links of different directions such as an uplink and a downlink are allocated at positions of same sub frames of neighboring eNodeBs.
Figure 24:
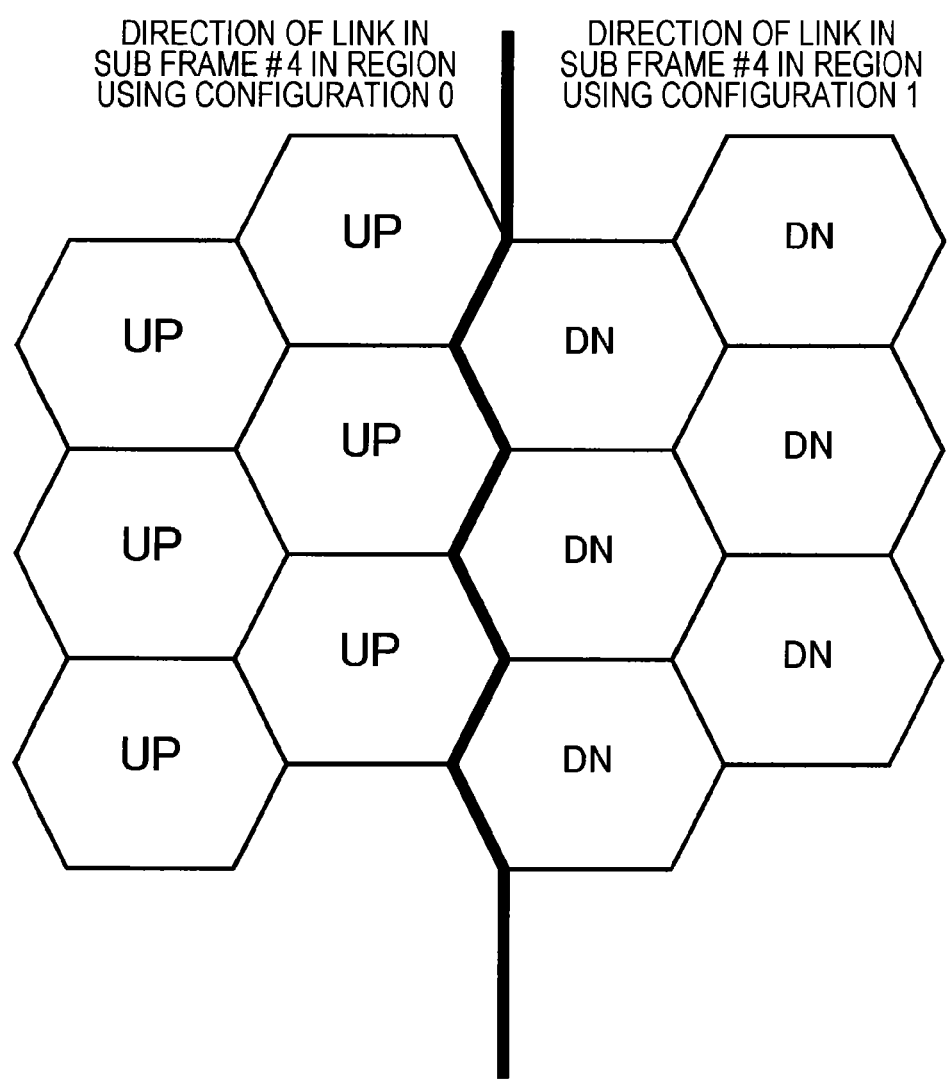
FIG. 24 is a diagram illustrating an example in which different TDD configurations are used in relative large areas.
Figure 25:
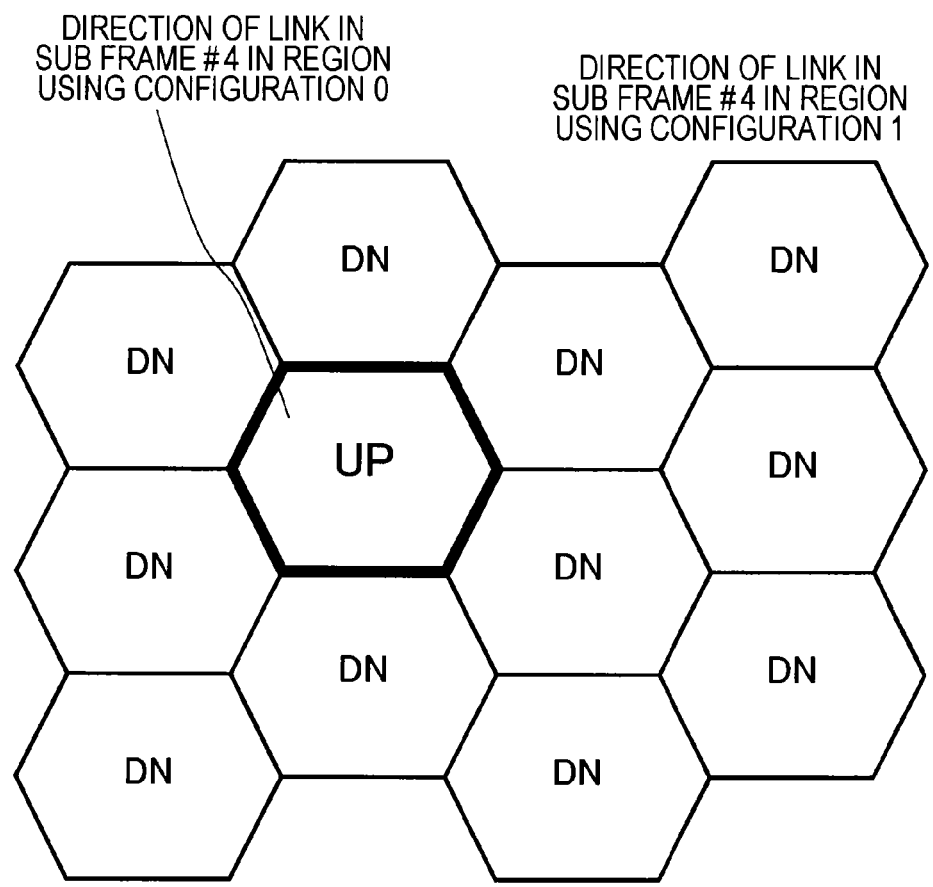
FIG. 25 is a diagram illustrating an example in which cells using different TDD configurations are located a spot-like manner.

FIG. 17 schematically illustrates a functional configuration of a communication device operating as a terminal (UE) in a cellular communication system according to the technology disclosed in the present disclosure.

When the terminal (UE) is notified of information related to a TDD configuration through signaling from a base station (eNodeB) controlling its own station, the terminal (UE) holds the TDD configuration in a configuration holding unit 1707. Further, when a position of a sub frame which is subjected to an ABS in a configuration to be used in the cell is notified through signaling from a base station, the position is hold in an ABS setting position holding unit 1708.

The terminal performs uplink or downlink communication in each sub frame of a radio frame according to a TDD configuration held in the configuration holding unit 1707.

The terminal receives user data to be transmitted to a base station through the uplink from an upper layer such as an application. An ABS inserting unit 1705 inserts an ABS into a position of a sub frame held in the ABS setting position holding unit 1708 in each of a PUCCH and a PUSCH.

A DA converting unit 1703 converts a digital transmission signal into an analog transmission signal. Then, an RF transceiving unit 1702 up-converts the analog transmission signal to an RF band, performs power amplification, and emits a resultant signal to space through an antenna 1701.

Further, when the terminal receives a downlink signal transmitted from a base station through the antenna 1701, the RF transceiving unit 1702 performs low noise amplification and down-conversion, and an AD converting unit 1704 performs digital conversion.

An ABS detecting unit 1706 detects an ABS from the uplink digital signal at a position of a sub frame held in the ABS setting position holding unit 1608 in each of a PDCCH and a PDSCH.

The technology disclosed in the present disclosure can have the following configurations.

(1) A wireless resource allocation method, including, a rearranging step of revising a configuration arrangement of a plurality of configurations in view of an increase in the number of downlink sub frames or a decrease in the number of uplink sub frames in a cellular communication system in which a plurality of configurations that differ in an uplink allocation and a downlink allocation of sub frames in a radio frame is defined, and a configuration switching step of switching configurations between neighboring cells according to the arrangement revised in the rearranging step when different configurations are used in the neighboring cells in the cellular communication system.

(2) The wireless resource allocation method according to (1), wherein, in the rearranging step, an arrangement of at least some configurations is revised to reduce the number of sub frames in which an uplink and a downlink are mismatched between adjacent configurations such that the plurality of configurations are arranged preferentially in the ascending order of the number of downlink sub frame rather than the descending order of the number of uplink sub frames.

(3) The wireless resource allocation method according to (1), wherein, in the rearranging step, an arrangement of at least some configurations is revised to reduce the number of sub frames in which an uplink and a downlink are mismatched between adjacent configurations such that the plurality of configurations are arranged preferentially in the descending order of the number of uplink sub frame rather than the ascending order of the number of downlink sub frames.

(4) The wireless resource allocation method according to any one of (1) to (3), further includes a new configuration inserting step of inserting a newly defined configuration between adjacent configurations in which the number of sub frames in which the uplink and the downlink are mismatched still increases in the arrangement revised in the rearranging step, wherein, in the configuration switching step, configurations are switched between the neighboring cells according to an arrangement in which the newly defined configuration is inserted.

(5) The wireless resource allocation method according to (4), wherein, in the new configuration inserting step, a configuration is newly defined such that sub frames in which the uplink and the downlink are mismatched between the adjacent configurations are dispersed into sub frames in which the uplink and the downlink are mismatched between the configuration and each of the adjacent configurations.

(6) The wireless resource allocation method according to any one of (1) to (5), further includes an interference avoiding step of avoiding interference between the neighboring cells in sub frames in which the uplink and the downlink are mismatched between the neighboring cells whose configurations are switched in the configuration switching step.

(7) The wireless resource allocation method according to (6), wherein, in the interference avoiding step, in sub frames in which the uplink and the downlink are mismatched between the neighboring cells, transmission from a base station and reception in a terminal in a cell allocated for the downlink are stopped.

(8) The wireless resource allocation method according to (6), wherein, in the interference avoiding step, in sub frames in which the uplink and the downlink are mismatched between the neighboring cells, transmission from a terminal and reception in a base station in a cell allocated for the uplink are stopped, or transmission from a base station and reception in a terminal in a cell allocated for the downlink are stopped so that sub frames whose transmission is stopped are not concentrated in some configurations.

(9) The wireless resource allocation method according to (6), wherein, in the interference avoiding step, in sub frames in which the uplink and the downlink are mismatched between the neighboring cells, transmission from a terminal and reception in a base station in a cell allocated for the uplink are stopped, or transmission from a base station and reception in a terminal in a cell allocated for the downlink are stopped according to concentration of traffic of each cell.

(10) The wireless resource allocation method according to (6), wherein, in the interference avoiding step, in sub frames in which a certain cell interferes with both adjacent cells using different configurations, transmission and reception in a base station and a terminal in the cell are stopped.

(11) A wireless resource allocation device, including a rearranging unit that revises a configuration arrangement of a plurality of configurations in view of an increase in the number of downlink sub frames or a decrease in the number of uplink sub frames in a cellular communication system in which a plurality of configurations that differ in an uplink allocation and a downlink allocation of sub frames in a radio frame are defined, and a configuration switching unit that switches configurations between neighboring cells according to the arrangement revised in the rearranging step when different configurations are used in the neighboring cells in the cellular communication system.

(12) A communication system that is configured to revise a configuration arrangement of a plurality of configurations in which an uplink allocation and a downlink allocation of sub frames in a radio frame are defined in view of an increase in the number of downlink sub frames and a decrease in the number of uplink sub frames, and switch configurations between neighboring cells according to the revised arrangement when different configurations are used in the neighboring cells.

INDUSTRIAL APPLICABILITY

The technology disclosed in the present disclosure has been described in detail with reference to a specific embodiment. However, it is obvious that a person skilled in the art can make modifications or substitutions on the above embodiment within the scope not departing from the gist of the technology disclosed in the present disclosure.

The present disclosure has been described in connection with the embodiment applied to a cellular communication system conforming to the LTE designed by the 3GPP, but the gist of the technology disclosed in the present disclosure is not limited to this example. Interference caused as the uplink and the downlink are mismatched when different configurations are used in neighboring cells can be avoided by similarly applying the present technology to various cellular communication systems in which a plurality of configurations in which an uplink allocation and a downlink allocation of sub frames in a radio frame are different from each other are defined.

In short, the present technology is disclosed as an embodiment, and thus the description of the present disclosure is not interpreted to be limited. The gist of the present technology should be determined in consideration of the appended claims.

REFERENCE SIGNS LIST

1601 Antenna
1602 RF transceiving unit
1603 DA converting unit
1604 AD converting unit
1605 ABS inserting unit
1606 ABS detecting unit
1607 Configuration holding unit
1608 ABS setting position holding unit
1701 Antenna
1702 RF transceiving unit
1703 DA converting unit
1704 AD converting unit 1705 ABS inserting unit
1706 ABS detecting unit
1707 Configuration holding unit
1708 ABS setting position holding unit

The invention claimed is:

1. A wireless resource allocation method, comprising:
arranging an order of a plurality of sub frame configurations in order of an increase in a number of downlink sub frames or a decrease in a number of uplink sub frames in a cellular communication system, each of the plurality of sub frame configurations differs in an uplink allocation and a downlink allocation of sub frames in a radio frame; and
selecting sub frame configuration settings of neighboring cells, the selected sub frame configuration settings having a predetermined relationship within the arranged order when different sub frame configurations are used in the neighboring cells in the cellular communication system.

2. The wireless resource allocation method according to claim 1,
wherein arranging the order of the plurality of sub frame configurations comprises revising at least some of the plurality of sub frame configurations to reduce a number of sub frames in which an uplink and a downlink are mismatched between adjacently ordered sub frame configurations such that the plurality of sub frame configurations are arranged preferentially in the ascending order of the number of downlink sub frames rather than the descending order of the number of uplink sub frames.

3. The wireless resource allocation method according to claim 1,
wherein arranging the order of the plurality of sub frame configurations comprises revising at least some of the plurality of sub frame configurations to reduce a number of sub frames in which an uplink and a downlink are mismatched between adjacently ordered sub frame configurations such that the plurality of sub frame configurations are arranged preferentially in the descending order of the number of uplink sub frames rather than the ascending order of the number of downlink sub frames.

4. The wireless resource allocation method according to claim 1, further comprising:
inserting a newly defined sub frame configuration between two previously adjacently ordered sub frame configurations such that a number of sub frames in which the uplink and the downlink are mismatched between the two previously adjacently ordered sub frame configurations is greater than that between the newly defined sub frame configuration and one of the two previously adjacently ordered sub frame configurations;
wherein selecting sub frame configuration settings of neighboring cells is performed after the newly defined sub frame configuration is inserted.

5. The wireless resource allocation method according to claim 4,
wherein the newly defined sub frame configuration is configured such that sub frames in which the uplink and the downlink are mismatched between the two previously adjacently ordered sub frame configurations are dispersed into sub frames in which the uplink and the downlink are mismatched between the newly defined sub frame configuration and each of the two previously adjacently ordered sub frame configurations.

6. The wireless resource allocation method according to claim 1, further comprising,
avoiding interference between the neighboring cells in sub frames in which the uplink and the downlink are mismatched between the neighboring cells by selectively stopping corresponding uplink or downlink transmission in at least one sub frame of the mismatched sub frames.

7. The wireless resource allocation method according to claim 6,
wherein avoiding interference comprises, in the sub frames in which the uplink and the downlink are mismatched between the neighboring cells, stopping transmission from a base station and reception in a terminal in a cell allocated for the downlink.

8. The wireless resource allocation method according to claim 6,
wherein avoiding interference comprises, in the sub frames in which the uplink and the downlink are mismatched between the neighboring cells, stopping transmission from a terminal and reception in a base station in a cell allocated for the uplink, or stopping transmission from a base station and reception in a terminal in a cell allocated for the downlink so that sub frames whose transmission is stopped are not concentrated in some sub frame configurations.

9. The wireless resource allocation method according to claim 6,
wherein avoiding interference comprises, in the sub frames in which the uplink and the downlink are mismatched between the neighboring cells, stopping transmission from a terminal and reception in a base station in a cell allocated for the uplink, or stopping transmission from a base station and reception in a terminal in a cell allocated for the downlink according to concentration of traffic of each cell.

10. The wireless resource allocation method according to claim 6,
wherein avoiding interference comprises, in the sub frames in which a certain cell interferes with both adjacent cells using different configurations, stopping transmission and reception in a base station and a terminal in the corresponding cell.

11. A wireless resource allocation device, comprising:
circuitry configured to
arrange an order of a plurality of sub frame configurations in order of an increase in the number of downlink sub frames or a decrease in the number of uplink sub frames in a cellular communication system, each of the plurality of sub frame configurations differs in an uplink allocation and a downlink allocation of sub frames in a radio frame; and
select sub frame configuration settings of neighboring cells, the selected sub frame configuration settings having a predetermined relationship within the arranged order when different sub frame configurations are used in the neighboring cells in the cellular communication system.

12. A communication system, comprising:
circuitry that is configured to
obtain an order of a plurality of sub frame configurations in which an uplink allocation and a downlink allocation of sub frames in a radio frame are defined in order of an increase in the number of downlink sub frames or a decrease in the number of uplink sub frames; and
select sub frame configuration settings of neighboring cells, the selected sub frame configuration settings having a predetermined relationship within the arranged order when different sub frame configurations are used in the neighboring cells.

13. The wireless resource allocation method according to claim 1, wherein selecting the sub frame configuration settings of the neighboring cells comprises setting the neighboring cells to have adjacently ordered sub frame configurations according to the arranged order when different sub frame configurations are used in the neighboring cells.

14. The wireless resource allocation device according to claim 11, wherein the circuitry is further configured to select the sub frame configuration settings of the neighboring cells by setting the neighboring cells to have adjacently ordered sub frame configurations according to the arranged order when different sub frame configurations are used in the neighboring cells.

15. The communication system according to claim 12, wherein the circuitry is further configured to select the sub frame configuration settings of the neighboring cells by setting the neighboring cells to have adjacently ordered sub frame configurations according to the arranged order when different sub frame configurations are used in the neighboring cells.

* * * * *